(12) United States Patent
Ghaemi et al.

(10) Patent No.: US 11,115,511 B1
(45) Date of Patent: Sep. 7, 2021

(54) COMMUNICATION DEVICE HAVING CONFIGURABLE HOUSING ASSEMBLY WITH MULTIPLE ANTENNAS

(71) Applicant: MOTOROLA MOBILITY LLC, Chicago, IL (US)

(72) Inventors: Kasra Ghaemi, Chicago, IL (US); Md Rashidul Islam, Glen Ellyn, IL (US); Junsheng Zhao, Vernon Hills, IL (US); Md Faisal Abedin, Lisle, IL (US); Mohammed R. Abdul-Gaffoor, Palatine, IL (US)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 17/170,451

(22) Filed: Feb. 8, 2021

(51) Int. Cl.
*H04M 1/02* (2006.01)
*H04B 7/06* (2006.01)

(52) U.S. Cl.
CPC ........ *H04M 1/0245* (2013.01); *H04B 7/0602* (2013.01); *H04M 1/0216* (2013.01)

(58) Field of Classification Search
CPC .................................................. H04M 1/0245
See application file for complete search history.

(56) References Cited

U.S. PATENT DOCUMENTS

| 6,885,353 | B2 | 4/2005 | Kurihara |
| 7,444,175 | B2 | 10/2008 | Ito et al. |
| 9,312,888 | B2 | 4/2016 | Weissman et al. |
| 10,523,292 | B2 | 12/2019 | Schwent et al. |
| 10,587,329 | B2 | 3/2020 | Maldonado et al. |
| 2005/0059444 | A1* | 3/2005 | Martinez .................. H01Q 1/40 455/575.7 |
| 2005/0128155 | A1* | 6/2005 | Fukuda .................... H01Q 1/38 343/745 |
| 2010/0022197 | A1* | 1/2010 | Kato ...................... H04B 1/005 455/75 |
| 2011/0014879 | A1* | 1/2011 | Alberth .................. H01Q 1/242 455/75 |
| 2011/0169613 | A1* | 7/2011 | Chen ....................... G01S 3/043 340/10.4 |
| 2012/0257508 | A1* | 10/2012 | Reunamaki ............. H04W 4/80 370/241 |
| 2015/0189619 | A1* | 7/2015 | Kalliola ................ H04W 4/023 455/456.1 |

(Continued)

*Primary Examiner* — Hsinchun Liao
(74) *Attorney, Agent, or Firm* — Isidore PLLC

(57) ABSTRACT

A communication device, method and computer program product enable multiple independent communication connections via multiple antennas supported by a configurable housing assembly having first and second housing portions connected for movement between open and closed positions. In response to housing assembly being in an open position, a radio frequency (RF) front end of the communication device is configured to independently communicate in at least a low band via first and second antennas supported by a first housing portion and second and fourth antennas supported by a second housing portion. In response to the housing assembly being in the closed position that brings the first and second antennas into proximity and the third and fourth antennas into proximity, the RF front end is configured to communicate via a first antenna array of the first and the second antennas and via a second antenna array of the third and the fourth antennas.

20 Claims, 17 Drawing Sheets

(56) References Cited

U.S. PATENT DOCUMENTS

| | | |
|---|---|---|
| 2017/0272108 A1 | 9/2017 | Filipovic et al. |
| 2019/0190548 A1 | 6/2019 | Chang et al. |
| 2020/0076488 A1* | 3/2020 | Brunel ................ H04B 7/0608 |
| 2020/0161764 A1* | 5/2020 | Liao ....................... H01Q 5/328 |
| 2020/0195336 A1* | 6/2020 | Raghavan ............... H04W 8/24 |

* cited by examiner ommunication device having configurable housing assembly with multiple antennas

1. TECHNICAL FIELD

The present disclosure relates generally to communication devices having multiple antennas that support simultaneous communication channels, and more particularly to communication devices having multiple antennas that supports simultaneous communication channels within a configurable housing assembly.

2. DESCRIPTION OF THE RELATED ART

Communication devices, such as smartphones, incorporate a number of antennas to support multiple frequency bands assigned to various types of communication networks. Generally-known communication devices having a flip form factor can have degraded antenna performance in certain RF bands when a configurable housing assembly of the communication device is folded or closed. During folding or closing, components in one movable portion of the communication device are brought close to components in the other portion of the communication device, changing antenna performance for certain antennas or antenna arrays. Conventionally, communication devices having a "candy bar" form factor that do not fold or close have an antenna architecture that spaces antennas around a periphery of a housing assembly. Communication devices having a flip form factor ("flip phone") are generally smaller with insufficient places to put antennas when closed for antenna isolation. Conventional flip phones provide degraded performance for simultaneous communication by multiple transceivers when the housing is in a closed position.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

Figure 1:
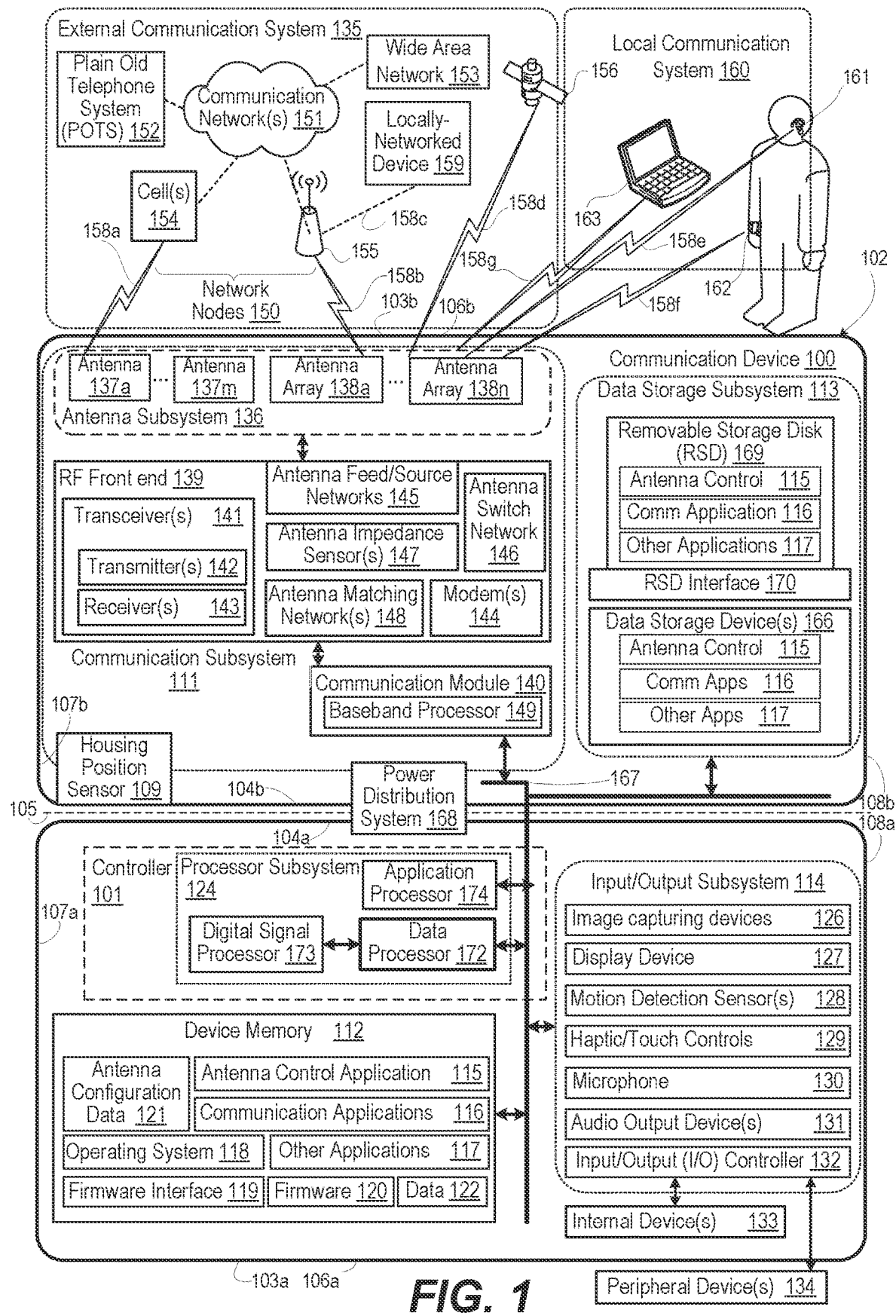
FIG. 1 depicts a functional block diagram of a communication device having multiple antennas operating in a communication environment and within which the features of the present disclosure are advantageously implemented, according to one or more embodiments.

According to aspects of the present disclosure, a communication device, a computer program product, and a method enable multiple transceivers to communicate via antennas supported by a configurable housing assembly. The communication device includes a housing assembly having first and second housing portions connected for relative movement between an open position and a closed position. The communication device includes at least four antennas each having an elongated shape that is aligned with a side edge of the corresponding housing portion and configured to communicate in at least a low radio frequency (RF) communication band. A first and a third antenna of the at least four antennas are supported by the first housing portion. A second and a fourth antenna of the at least four antennas are supported by the second housing portion. The first and second antennas are proximate and substantially aligned in parallel to each other when the housing assembly is in the closed position. The first and the second antennas are separated from each other when the housing assembly is in the open position. The third and fourth antennas are proximate and substantially aligned in parallel to each other when the housing assembly is in the closed position. The third and the fourth antennas are separated from each other when the housing assembly is in the open position. The communication device includes a housing position sensor that detects when the housing assembly is in the closed position and when the housing assembly is in an at least partially open position. The communication device includes a radio frequency (RF) front end that is communicatively coupled to the at least four antennas. The RF front end has two or more transceivers to utilize the at least four antennas for simultaneous dual connectivity for low band communication. A controller is communicatively coupled to the housing position sensor and the RF front end. In response to determining that the housing assembly is in the at least partially open position, the controller configures the RF front end to communicate via the first, second, third and fourth antennas independently. In response to determining that the housing assembly is in the closed position, the controller configures the RF front end to communicate via the first and the second antennas as a first antenna array and to communicate via the third and the fourth antennas as a second antenna array.

As introduced above, in one or more embodiments, the communication device can have a configurable housing assembly that folds to a closed position and unfolds to an open position. In the closed state, antennas in a flip housing portion (referred to herein as flip antennas for brevity) are co-located proximate and nearly touching corresponding antennas in a base housing portion (referred to herein as base antennas for brevity). In the open state, the antennas in the flip and base housing portions are separate (not proximate) and sufficiently electromagnetically isolated to not interfere with each other. The antennas are physically configured for various band operating modes: ultra-low (UL) band, low band (LB), mid-band (MB), high band (HB), and ultra-high band (UHB). The RF front end selectively configures the antenna transmitting or receiving paths based on measured performance parameters for antenna switch diversity. The communication device is configured for dual connectivity modes such as carrier aggregation (CA) or evolved-universal terrestrial radio access-new radio dual connectivity (ENDC). A controller of the communication device configures the RF front end based on a flip-open or flip-closed state of the housing assembly. First, in the flip-closed state, one of the flip or base antennas proximate to each other are not used to support UL/LB and is placed in a detuned-mode to prevent poor performance of the other antennas. Antenna switch diversity (AS-DIV) is changed from a top to bottom mode to a right to left mode for various hand-grips. Second, in the flip-closed state, a switch (aperture tuner) connects one of the sets of base or flip right and left antennas together. The aperture switch can also add passive tuning elements to improve the base or flip antenna performance on a band-by-band basis. Third, in the flip closed state, an electrical coupling connection connects the right and left base antennas with the right and left flip antennas and also can add passive tuning elements to improve the antenna performance on a band-by-band basis. To further enhance antenna performance, the communication device can include a hinge mechanism that provides a conductive connection for ground current between flip and base housing portions. For example, one hinge of the hinge mechanism can be electrically isolated, and another hinge of the hinge mechanism can provide the ground path. For another example, an electrical contact that completes a grounding path can be opened or closed based on flip position.

Particular public land mobile network (PLMN) and radio access technology (RAT) combinations can use one or more of these RF bands. Services based on 802.11 wireless standards and global positioning system (GPS) signals also use some of these RF bands. Recent designs of communication devices incorporate an increased number of antennas and antenna arrays for spatial diversity, carrier aggregation, dual connectivity, and directional antenna gain via multiple-input multiple output (MIMO) operations. The communication device supports the RAT and wireless communication bands including low bands using antennas in a configurable housing assembly.

In the following detailed description of exemplary embodiments of the disclosure, specific exemplary embodiments in which the various aspects of the disclosure may be practiced are described in sufficient detail to enable those skilled in the art to practice the invention, and it is to be understood that other embodiments may be utilized and that logical, architectural, programmatic, mechanical, electrical, and other changes may be made without departing from the spirit or scope of the present disclosure. The following detailed description is, therefore, not to be taken in a limiting sense, and the scope of the present disclosure is defined by the appended claims and equivalents thereof. Within the descriptions of the different views of the figures, similar elements are provided similar names and reference numerals as those of the previous figure(s). The specific numerals assigned to the elements are provided solely to aid in the description and are not meant to imply any limitations (structural or functional or otherwise) on the described embodiment. It will be appreciated that for simplicity and clarity of illustration, elements illustrated in the figures have not necessarily been drawn to scale. For example, the dimensions of some of the elements are exaggerated relative to other elements.

It is understood that the use of specific component, device and/or parameter names, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized.

Thus, each term utilized herein is to be given its broadest interpretation given the context in which that term is utilized.

As further described below, implementation of the functional features of the disclosure described herein is provided within processing devices and/or structures and can involve use of a combination of hardware, firmware, as well as several software-level constructs (e.g., program code and/or program instructions and/or pseudo-code) that execute to provide a specific utility for the device or a specific functional logic. The presented figures illustrate both hardware components and software and/or logic components.

Those of ordinary skill in the art will appreciate that the hardware components and basic configurations depicted in the figures may vary. The illustrative components are not intended to be exhaustive, but rather are representative to highlight essential components that are utilized to implement aspects of the described embodiments. For example, other devices/components may be used in addition to or in place of the hardware and/or firmware depicted. The depicted example is not meant to imply architectural or other limitations with respect to the presently described embodiments and/or the general invention. The description of the illustrative embodiments can be read in conjunction with the accompanying figures. Embodiments incorporating teachings of the present disclosure are shown and described with respect to the figures presented herein.

FIG. 1 is a functional block diagram of an electronic device, and more particularly communication device 100, having multiple antennas that are managed by controller 101, in an operating environment within which the features of the present disclosure are advantageously implemented. According to one aspect, communication device 100 includes housing assembly 102. Housing assembly 102 is configurable by having first and second housing portions 103a-103b connected at respective first and second proximal sides 104a-104b enabling relative movement between an open position and a closed position about lateral axis 105. Each of first and the second housing portions 103a-103b has respective distal side 106a-106b, opposite to proximal side 104a-104b. First lateral side 107a and second lateral side 108a extend between proximal side 104a and distal side 106a of first housing portion 103a. First lateral side 107b and second lateral side 108b extend between proximal side 104b and distal side 106b of second housing portion 103b. Communication device 100 includes housing position sensor 109 and communication subsystem 111. Controller 101 is communicatively coupled to housing position sensor 109, which detects when housing assembly 102 is in: (i) a closed position; and (ii) at least a partially open position or a fully open position. Controller 101 configures communication subsystem 111 to operate based at least in part on the position of housing assembly 102. Housing position sensor 109 can be one of: (i) a two-position binary switch which detects the closed position and any other position considered a partially open position (i.e., not a closed position); (ii) a multiple position switch of discrete values; or (iii) a continuous range sensor. With each implementation, housing position sensor 109 detects the partially open position based on the two housing portions being a predetermined distance or number of degrees apart from each other (e.g., at 30° or 45°). The distance or number of degrees can be empirically determined to correspond with when the antennas are sufficiently apart from each other to not cause antenna-to-antenna transmission interference.

Communication device 100 can be one of a host of different types of devices, including but not limited to, a mobile cellular phone, satellite phone, or smart-phone, a laptop, a net-book, an ultra-book, a networked smart watch, or networked sports/exercise watch, and/or a tablet computing device or similar device that can include wireless and/or wired communication functionality. As an electronic device supporting wireless communication, communication device 100 can be utilized as, and also be referred to as, a system, device, subscriber unit, subscriber station, mobile station (MS), mobile, mobile device, remote station, remote terminal, user terminal, terminal, user agent, user device, a Session Initiation Protocol (SIP) phone, a wireless local loop (WLL) station, a personal digital assistant (PDA), computer workstation, a handheld device having wireless connection capability, a computing device, or other processing devices connected to a wireless modem.

Referring again to FIG. 1, communication device 100 includes communication subsystem 111, device memory 112, data storage subsystem 113, and input/output (I/O) subsystem 114. Device memory 112 and each subsystem (111, 113, and 114) are managed by controller 101. Device memory 112 includes program code and applications such as antenna control application 115, communication applications 116, and other application(s) 117 that use communication services. Device memory 112 further includes operating system (OS) 118, firmware interface 119, such as basic input/output system (BIOS) or Uniform Extensible Firmware Interface (UEFI), and firmware 120. Device memory 112 includes antenna configuration data 121 or other computer data 122 used by antenna control application 115. As an example, antenna configuration data 121 can include antenna assignments to a particular transceiver communication channel based on operating contexts. As an example, context can be MIMO antenna control for increased antenna gain. As another example, the context can be supporting execution of one or more applications. Particular applications can have minimum rates of transmitting and receiving data with specific data latency requirements that dictate prioritization of communication connections. As an additional example, context can be based at least in part on power consumption and device thermal management that limit communication channels.

Processor subsystem 124 of controller 101 executes program code to provide operating functionality of communication device 100. The software and/or firmware modules have varying functionality when their corresponding program code is executed by processor subsystem 124 or secondary processing devices within communication device 100. According to one embodiment, processor subsystem 124 of controller 101 executes program code of antenna control application 115 to configure communication subsystem 111.

I/O subsystem 114 includes image capturing device(s) 126. I/O subsystem 114 includes user interface devices such as display device 127, motion detection sensors 128, touch/haptic controls 129, microphone 130, and audio output device(s) 131. I/O subsystem 114 also includes I/O controller 132. In one or more embodiments, motion detection sensors 128 can detect an orientation and movement of the communication device 100 that indicates that the communication device 100 should activate display device 127 or should vertically reorient visual content presented on display device 127. In one or more embodiments, motion detection sensors 128 are used for functions other than user inputs, such as detecting an impending ground impact. I/O controller 132 connects to internal devices 133, which are internal to housing assembly 102, and to peripheral devices 134, such as external speakers, which are external to housing assembly 102 of communication device 100. Examples of internal devices 133 are the computing, storage, communication, or sensing components depicted within housing assembly 102. I/O controller 132 supports the necessary configuration of connectors, electrical power, communication protocols, and data buffering to act as an interface for internal devices 133 and peripheral devices 134 to other components of communication device 100 that use a different configuration for inputs and outputs.

Communication subsystem 111 of communication device 100 enables wireless communication with external communication system 135. Communication subsystem 111 includes antenna subsystem 136 having lower band antennas 137a-137m and higher band antenna array modules 138a-138n that can be attached in/at different portions of housing assembly 102. Increasingly, communication devices, such as smartphones, incorporate a number of antennas to support multiple frequency bands assigned to various types of communication networks. Multiple radio frequency (RF) bands, including ultra-low band (UL), low band (LB), mid-band (MB), high band (HB), and ultra-high band (UHB), are supported by the various antennas within the communication devices. Particular public land mobile network (PLMN) and radio access technology (RAT) combinations, as well as services based on 802.11 wireless and global positioning system (GPS) signals, can use one or more of these RF bands.

Communication subsystem 111 includes radio frequency (RF) front end 139 and communication module 140. RF front end 139 includes transceiver(s) 141, which includes transmitter(s) 142 and receiver(s) 143. RF front end 139 further includes modem(s) 144. RF front end 139 includes antenna feed/source networks 145, antenna switch network 146, antenna impedance sensor(s) 147, and antenna matching network(s) 148. Communication module 140 of communication subsystem 111 includes baseband processor 149 that communicates with controller 101 and RF front end 139. Baseband processor 149 operates in a baseband frequency range to encode data for transmission and decode received data, according to a communication protocol. Modem(s) 144 modulate baseband encoded data from communication module 140 onto a carrier signal to provide a transmit signal that is amplified by transmitter(s) 142. Modem(s) 144 demodulates each signal received from external communication system 135 detected by antenna subsystem 136. The received signal is amplified and filtered by receiver(s) 143, which demodulate received encoded data from a received carrier signal. Antenna feed/source networks 145 transmits or receives from particular portions of antenna subsystem 136 and can adjust a phase between particular portions of antenna subsystem 136. Antenna switch network 146 can connect particular combinations of antennas (137a-137m, 138a-138n) to transceiver(s) 141. Controller 101 can monitor changes in antenna impedance detected by antenna impedance sensor(s) 147 for determining portions of antenna subsystem 136 that are blocked. Antenna matching network(s) 148 are connected to particular lower band antennas 137a-137m to tune impedance respectively of lower band antennas 137a-137m to match impedances of transceivers 141. Antenna matching network(s) 148 can also be used to detune the impedance of a particular one of lower band antennas 137a-137m to not match the impedance of transceivers 141 in order to electromagnetically isolate the particular one of lower band antennas 137a-137m.

In one or more embodiments, controller 101, via communication subsystem 111, performs multiple types of over-the-air (OTA) communication with network nodes 150 of external communication system 135. Each of network nodes 150 can be part of a particular one of communication networks 151. One or more communication networks 151 can be public land mobile networks (PLMNs) that provide connections to plain old telephone systems (POTS) 152 for voice calls and wide area networks (WANs) 153 for data sessions. WANs 153 can include Internet and other data networks. The particular network nodes 150 can be cells 154 such as provided by base stations or base nodes that support cellular OTA communication using RAT as part of a radio access network (RAN). Unlike earlier generations of cellular services, where voice and data were handled using different RATs, both are now integrated with voice being considered one kind of data communication. Conventionally, broadband, packet-based transmission of text, digitized voice, video, and multimedia communication are provided using Fourth generation (4G) RAT of evolved UTMS radio access (E-UTRA), referred to a Long Term Evolved (LTE), although some cellular data service is still being provided by third generation (3G) Universal Mobile Telecommunications Service (UMTS). A fifth generation (5G) RAT, referred to as fifth generation new radio (5G NR), is being deployed to at least augment capabilities of 4G LTE with a yet higher capability of data transfer. Development continues for what will be six generation (6G) RATs and more advanced RATs. Multiple radio frequency (RF) bands are used to support these RATs. The RF bands include ultra-low band (UL), low band (LB), mid-band (MB), high band (HB), and ultra-high band (UHB).

In one or more embodiments, network nodes 150 can be access node(s) 155 that support wireless OTA communication. Communication subsystem 111 can receive OTA communication from location services such as provided by global positioning system (GPS) satellites 156. Communication subsystem 111 receives downlink broadcast channel(s) 158d from GPS satellites 156 to obtain geospatial location information. Communication subsystem 111 communicates via OTA communication channel(s) 158a with cells 154. Communication subsystem 111 communicates via wireless communication channel(s) 158b with access node 155. In one or more particular embodiments, access nodes 155 support communication using one or more IEEE 802.11 wireless local area network (WLAN) protocols. Wi-Fi is a family of wireless network protocols, based on the IEEE 802.11 family of standards, which are commonly used for local area networking between user devices and network devices that provide access to the Internet. In one or more particular embodiments, communication subsystem 111 communicates with one or more locally networked devices 159 via wired or wireless link 158c provided by access node 155.

In one or more embodiments, controller 101, via communication subsystem 111, performs multiple types of OTA communication with local communication system 160. In one or more embodiments, local communication system 160 includes wireless headset 161 and smart watch 162 that are coupled to communication device 100 to form a personal access network (PAN). Communication subsystem 111 communicates via low power wireless communication channel(s) 158e with headset 161. Communication subsystem 111 communicates via second low power wireless communication channel(s) 158f, such as Bluetooth, with smart watch 162. In one or more particular embodiments, communication subsystem 111 communicates with other communication device(s) 163 via wireless link 158g to form an ad hoc network.

Data storage subsystem 113 of communication device 100 includes data storage device(s) 166. Controller 101 is communicatively connected, via system interlink 167, to data storage device(s) 166. Data storage subsystem 113 provides applications, program code, and stored data on nonvolatile storage that is accessible by controller 101. As an example, data storage subsystem 113 can provide a selection of program code and applications such as antenna control application 115, location service applications 116, and other application(s) 117 that use communication services. These applications can be loaded into device memory 112 for execution by controller 101. In one or more embodiments, data storage device(s) 166 can include hard disk drives (HDDs), optical disk drives, and/or solid-state drives (SSDs), etc. Data storage subsystem 113 of communication device 100 can include removable storage device(s) (RSD(s)) 169, which is received in RSD interface 170. Controller 101 is communicatively connected to RSD 169, via system interlink 167 and RSD interface 170. In one or more embodiments, RSD 169 is a non-transitory computer program product or computer readable storage device. Controller 101 can access RSD 169 or data storage device(s) 166 to provision communication device 100 with program code, such as antenna control application 115 and other applications 117. When executed by controller 101, the program code causes or configures communication device 100 to provide the multi-transceiver operational functionality using configurable housing assembly 102 described herein.

Controller 101 includes processor subsystem 124, which includes one or more central processing units (CPUs), depicted as data processor 172. Processor subsystem 124 can include one or more digital signal processors 173 that are integrated with data processor 172 or are communicatively coupled to data processor 172, such as baseband processor 149 of communication module 140. Controller 101 can include one or more application processor(s) 174 to monitor sensors or controls such as housing position sensor 109 and antenna switch network 146. In one or more embodiments that are not depicted, controller 101 can further include distributed processing and control components that are peripheral or remote to housing assembly 102 or grouped with other components, such as I/O subsystem 114. Data processor 172 is communicatively coupled, via system interlink 167, to device memory 112. In one or more embodiments, controller 101 of communication device 100 is communicatively coupled via system interlink 167 to communication subsystem 111, data storage subsystem 113, and input/output subsystem 114. System interlink 167 represents internal components that facilitate internal communication by way of one or more shared or dedicated internal communication links, such as internal serial or parallel buses. As utilized herein, the term "communicatively coupled" means that information signals are transmissible through various interconnections, including wired and/or wireless links, between the components. The interconnections between the components can be direct interconnections that include conductive transmission media or may be indirect interconnections that include one or more intermediate electrical components. Although certain direct interconnections (interlink 167) are illustrated in FIG. 1, it is to be understood that more, fewer, or different interconnections may be present in other embodiments. Interlink 167 communicatively connects components in first housing portion 103a to components in second housing portion 103b. Power distribution subsystem 168 provides electrical power to components in first housing portion 103a and components in second housing portion 103b.

Controller 101 manages, and in some instances directly controls, the various functions and/or operations of communication device 100. These functions and/or operations include, but are not limited to including, application data processing, communication with other communication devices, navigation tasks, image processing, and signal processing. In one or more alternate embodiments, communication device 100 may use hardware component equivalents for application data processing and signal processing. As an example, communication device 100 may use special purpose hardware, dedicated processors, general purpose computers, microprocessor-based computers, micro-controllers, optical computers, analog computers, dedicated processors and/or dedicated hard-wired logic.

Figure 2A:
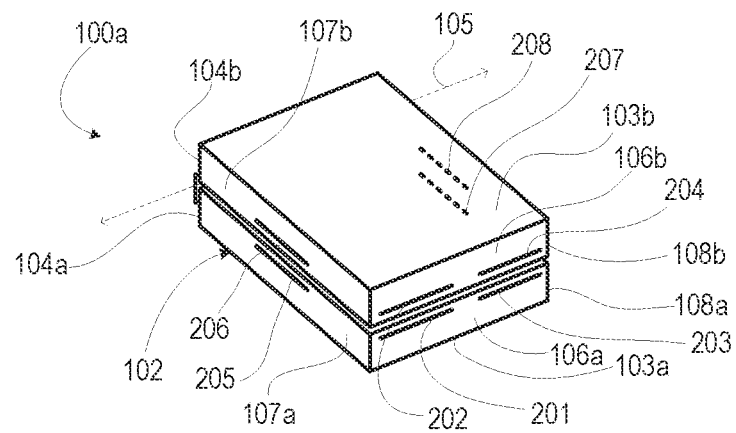
FIG. 2A depicts a three-dimensional view of an example communication device having multiple antennas within a configurable housing assembly that is presented in a closed position, according to one or more embodiments.
Figure 2B:
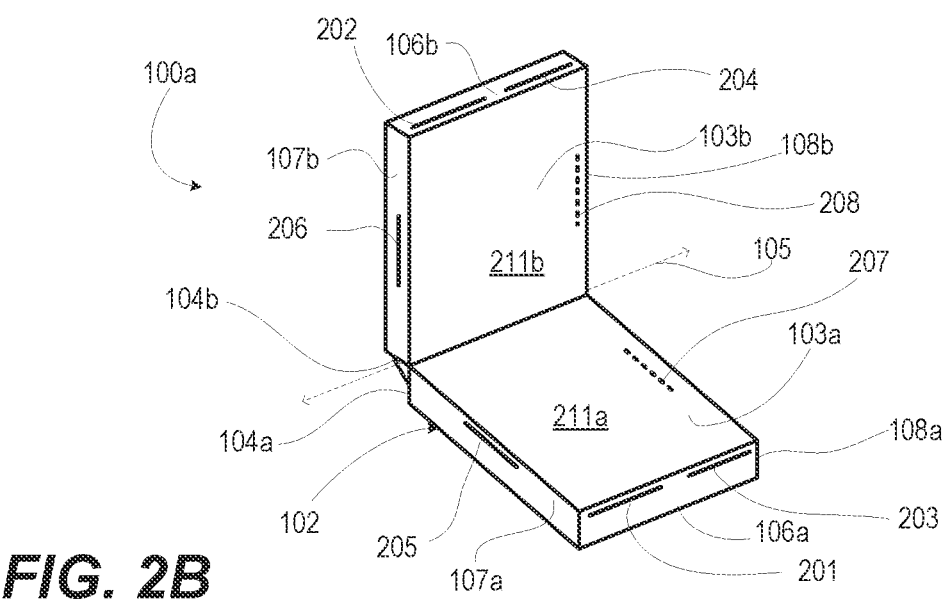
FIG. 2B depicts a three-dimensional view of the example communication device of FIG. 2A with the configurable housing assembly in a partially open position, according to one or more embodiments.
Figure 2C:
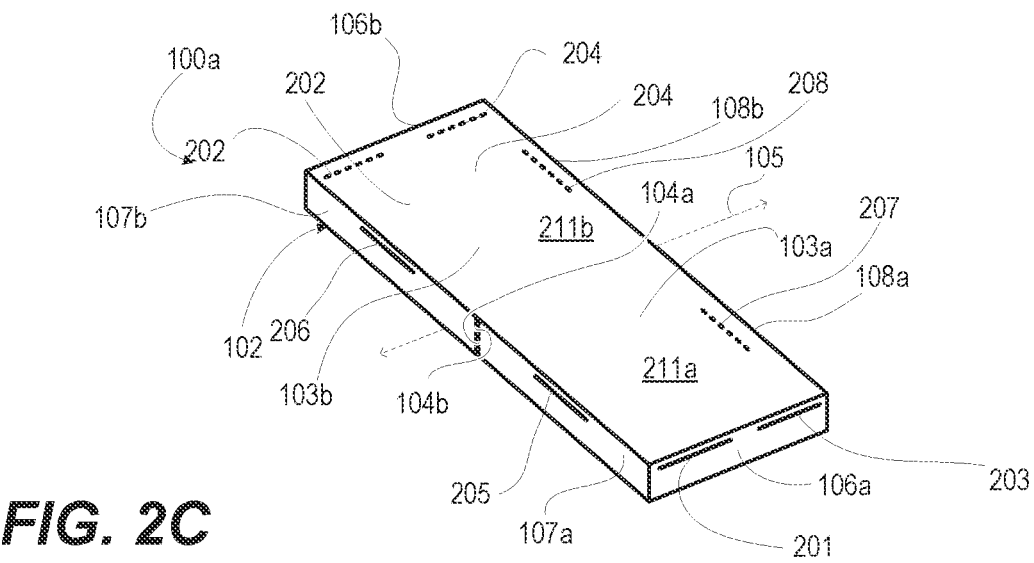
FIG. 2C depicts a three-dimensional view of the example communication device of FIG. 2A with the configurable housing assembly in a fully open position, according to one or more embodiments.

Within the description of the remaining figures, references to similar components presented in a previous figure are provided the same reference numbers across the different figures. Where the named component is presented with different features or functionality, a different reference numeral or a subscripted reference numeral is provided (e.g., 100a in place of 100). FIG. 2A depicts a three-dimensional example of communication device 100a having housing assembly 102 configured in a closed position. Communication device 100a can have similar or identical components and functionality of communication device 100 (FIG. 1). FIG. 2B depicts a three-dimensional view of example communication device 100a having housing assembly 102 configured in a partially open position. Housing position sensor 109 (FIG. 1) can detect a particular amount of pivoting from the closed position to the partially open position that is sufficient for a change in an operational characteristic of communication device 100a. Housing position sensor 109 can be one of: (i) a two position binary switch which detects the closed position and any other position considered partially open position (i.e., not a closed position); (ii) a multiple position switch of discrete values; or (iii) a continuous range sensor. The partially open position can be sufficient for viewing display device 127 (FIG. 1), prompting controller 101 (FIG. 1) to activate display device 127 (FIG. 1). FIG. 2C depicts a three-dimensional view of example communication device 100a having housing assembly 102 configured in a fully open position.

In FIGS. 2A-2C, communication device 100a includes housing assembly 102 that is configurable by having first and second housing portions 103a-103b. First and second housing portions 103a-103b are connected at respective first and second proximal sides 104a-104b for relative movement between an open position and a closed position about lateral axis 105. Each of first and the second housing portions 103a-103b has respective distal side 106a/106b opposite to proximal side 104a/104b. First lateral side 107a and second lateral side 108a extend between proximal side 104a and distal side 106a of first housing portion 103a. First lateral side 107b and second lateral side 108b extend between proximal side 104b and distal side 106b of second housing portion 103b. In one embodiment, first housing portion 103a is a base housing. Second housing portion 103b is a flip housing. First lateral sides 107a-107b are on the left. Second lateral sides 108a-108b are on the right.

According to one aspect, housing assembly 102 includes a plurality of possible antenna mounting locations, illustrated as antenna mounting locations 201-208. First antenna mounting location 201 is a left section of distal side 106a of first housing portion 103a. Second antenna mounting location 202 is a left section of distal side 106b of second housing portion 103b. Third antenna mounting location 203 is a right section of distal side 106a of first housing portion 103a. Fourth antenna mounting location 204 is a right section of distal side 106b of second housing portion 103b. Fifth antenna mounting location 205 is on left lateral side 107a of first housing portion 103a. Sixth antenna mounting location 206 is on left lateral side 107b of second housing portion 103b. Seventh antenna mounting location 207 is on right lateral side 108a of first housing portion 103a. Eighth antenna mounting location 208 on right lateral side 108b of second housing portion 103b. While housing assembly 102 is in the closed position of FIG. 2A, specific pairs of antenna mounting locations 201-208 are aligned proximate to each other across the base and flip housing. These aligned pairs include: (i) first and second antenna mounting locations 201-202; (ii) third and fourth antenna mounting locations 203-204; (iii) fifth and sixth antenna mounting locations 205-206; and (iv) seventh and eight antenna mounting locations 207-208. While housing assembly 102 is in the closed position, the close proximity of the antenna locations in each pair impairs antenna efficiency. The present disclosure avoids putting two of antennas 137a-137d (FIG. 1) in the same pair of antenna mounting locations 201-208, enabling communication in the low bands in either of the open and closed positions of housing assembly 102. At a partially open position of housing assembly 102 in FIG. 2B, separation between first and second housing portions 103a-103b is sufficient for viewing front surfaces 211a-211b respectively of first and second housing portions 103a-103b. The at least partially open position of housing assembly 102 can be one or more positions greater than 0° and less than 180° defined as pivot angles between first and second housing portions 103a-103b. As an example, the defined pivot angles can be based on one or more considerations such as: (i) capabilities of housing position sensor 109 (FIG. 1); (ii) mechanically available positions of housing position 102; (iii) usability of user interface components; and (iv) spatial coverage of antennas 137a-137d as a function of pivot angle. As one example, housing assembly 102 can have a pivot mechanism that is stable in three positions: (i) fully closed; (ii) open 90°; and (iii) fully open. At least partially open position can be based on a pivot position of at least 45° that corresponds to activating a front display device in preparation for viewing at 90° or fully open. As another example, certain pivot positions affect ability of communication device 100 to communicate in certain spatial directions. detecting one or more positions of housing 102 can be used to select antennas 137a-137d for spatial diversity. Two or more at least partially open positions of housing assembly 102 can be detected for triggering changes in an operational mode of communication device 100a, such as changing a use of display devices 127 (FIG. 1). For clarity, eight (8) positions 201-208 for four (4) antennas 137a-137d (FIG. 1) are described. In one or more embodiments, fewer or more antenna positions can be provided for use with fewer or more antennas. In FIG. 2C, housing assembly 102 is in a fully open position with substantially 180° rotation between first and second housing portions 103a-103b.

Figure 3A:
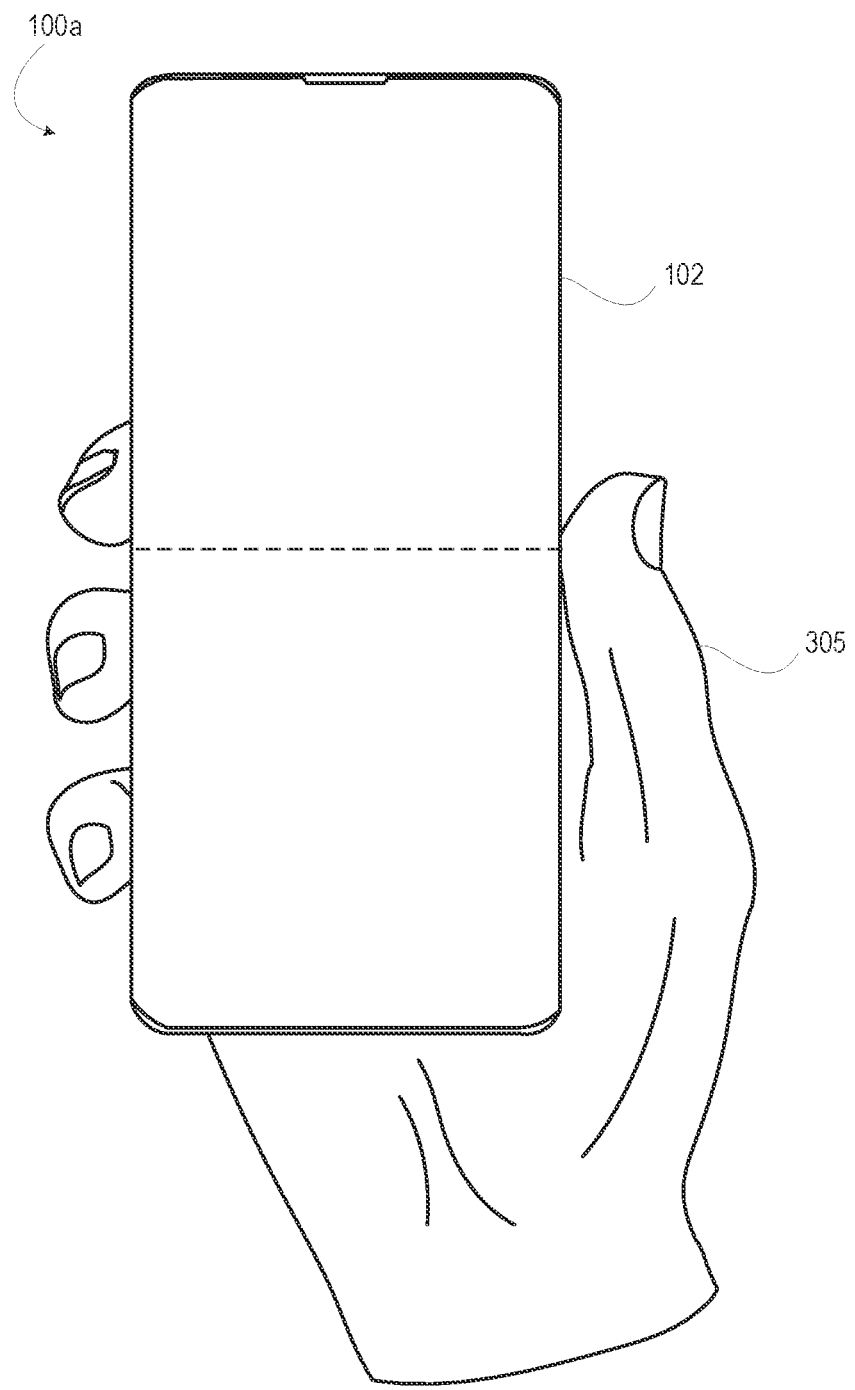
FIG. 3A depicts a front view of an example communication device being held in a hand while the configurable housing assembly is in an open position, according to one or more embodiments.
Figure 3B:
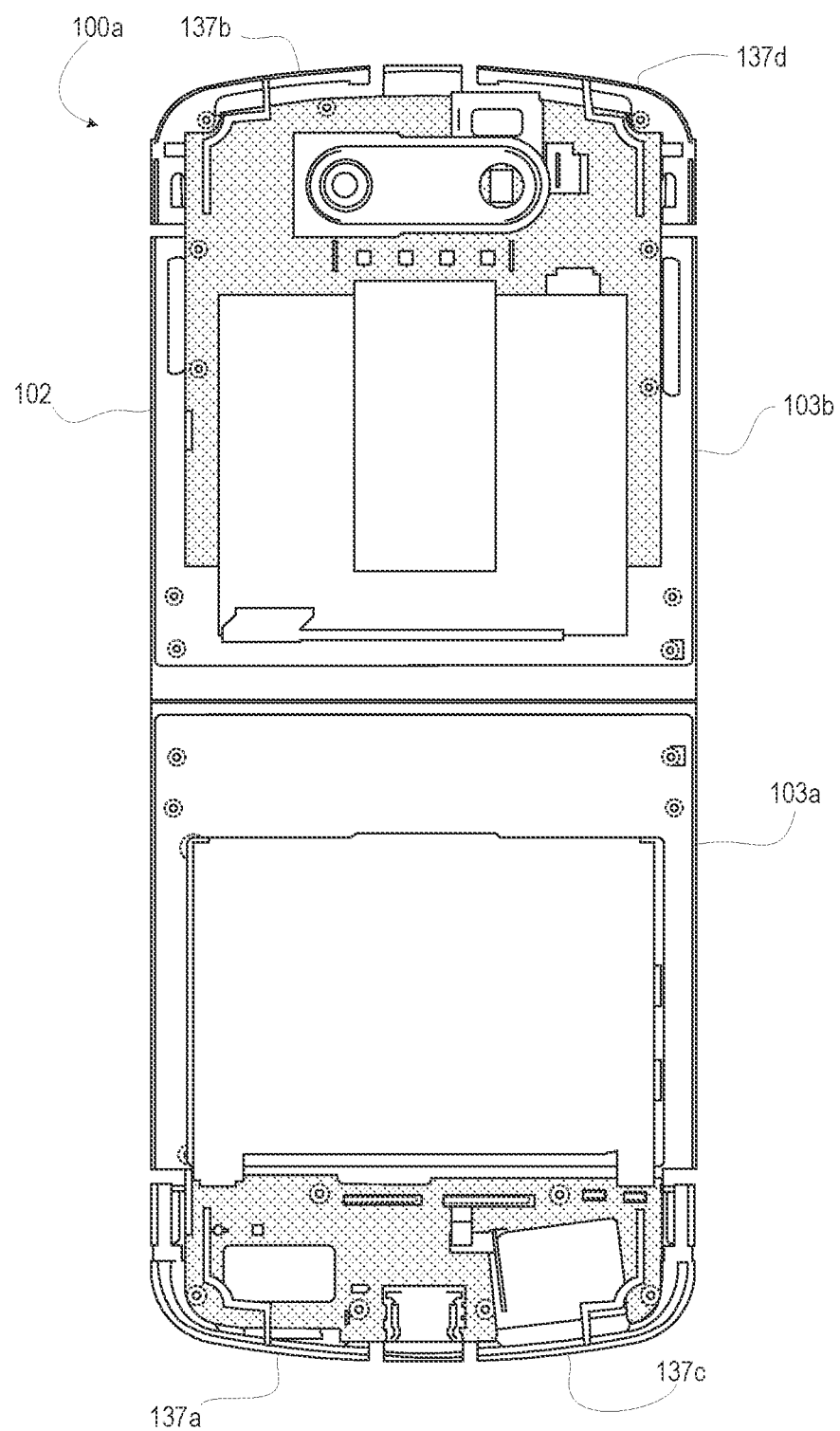
FIG. 3B depicts a partially disassembled view of the example communication device of FIG. 3A with the configurable housing assembly in an open position, according to one or more embodiments.
Figure 3C:
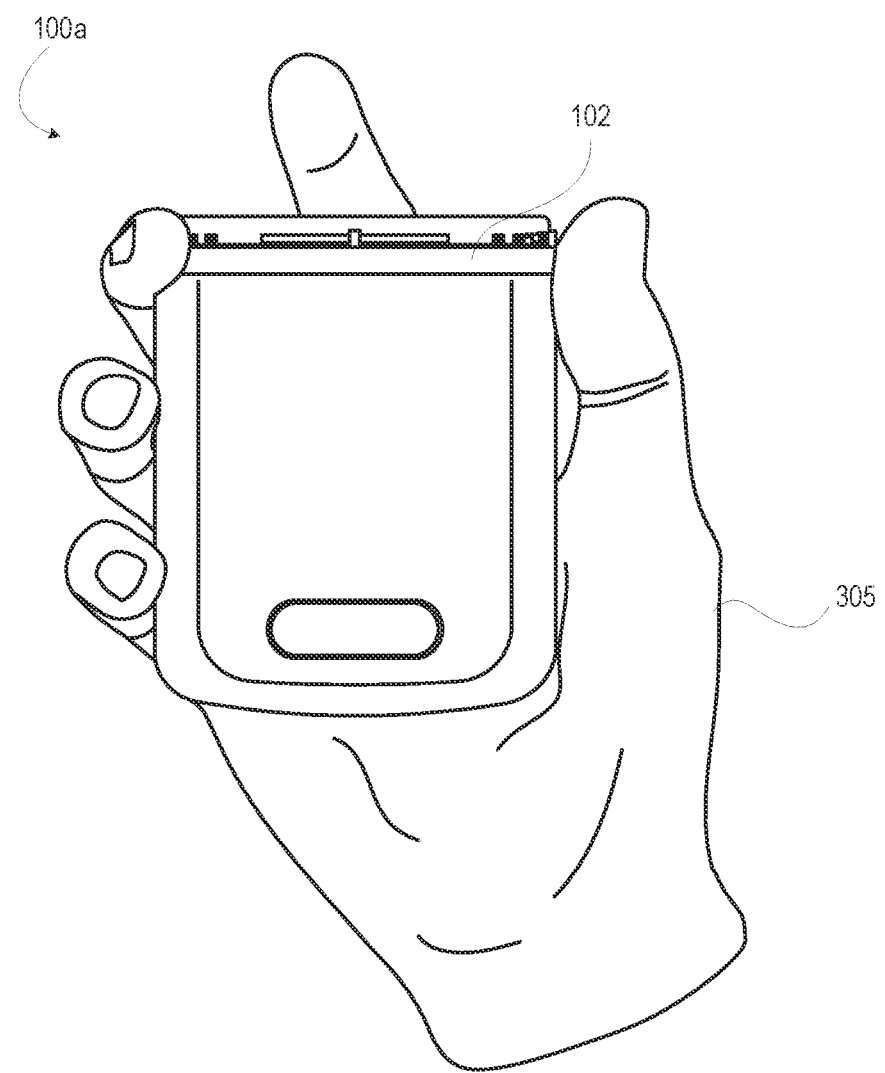
FIG. 3C depicts a front view of the example hand-held communication device of FIG. 3A with the housing assembly in a closed position, according to one or more embodiments.
Figure 3D:
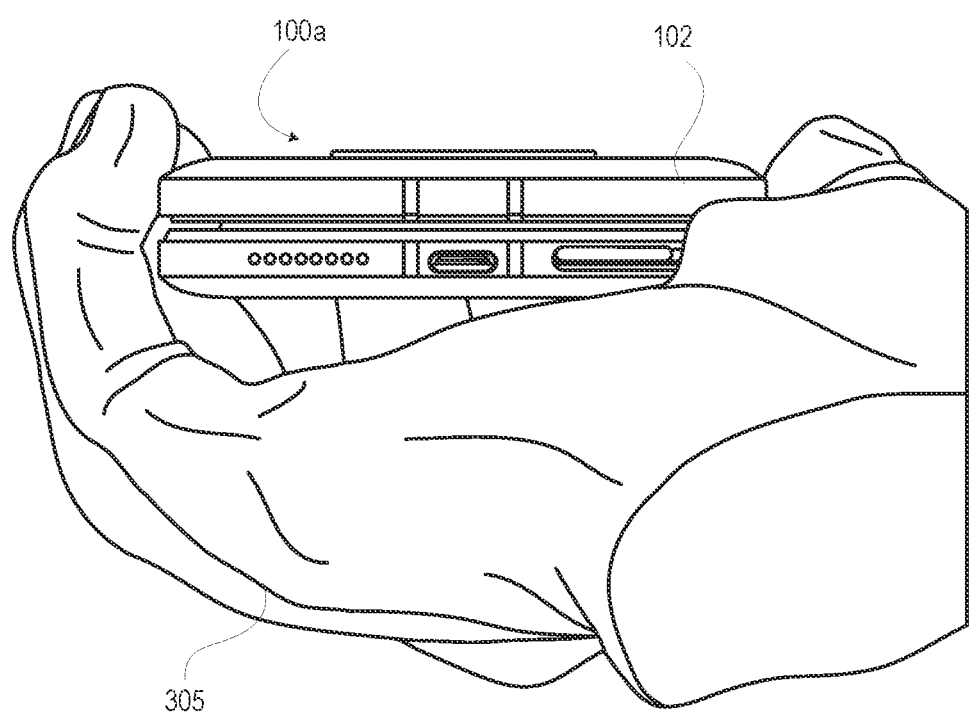
FIG. 3D depicts a bottom view of the example communication device of FIG. 3C with the housing assembly in a closed position and being held in a hand, according to one or more embodiments.
Figure 3E:
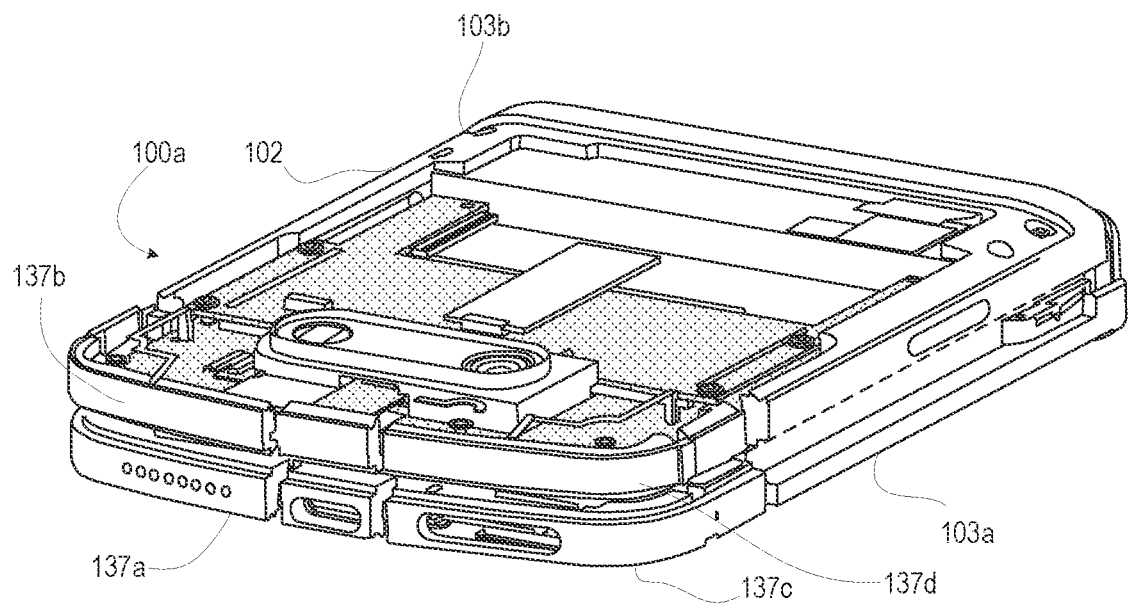
FIG. 3E depicts a three-dimensional view of the example communication device of FIG. 3C with the housing assembly in a closed position, according to one or more embodiments.
Figure 3F:
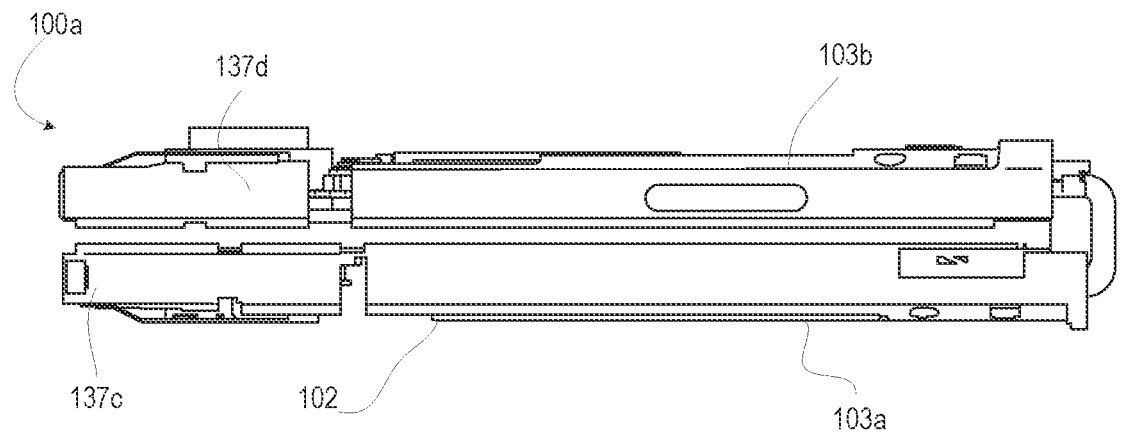
FIG. 3F depicts a side view of the example communication device of FIG. 3E, according to one or more embodiments.

FIGS. 3A-3F provides a series of different views of example communication device 100a with housing assembly 102 in both the open and closed positions, according to multiple embodiments. Specifically, FIG. 3A depicts a front view of example communication device 100a having configurable housing assembly 102 in an open position being held in hand 305. FIG. 3B depicts a front view of example communication device 100a that is partially disassembled and having configurable housing assembly 102 in an open position. FIG. 3C depicts a front view of example communication device 100a being held in hand 305 while housing assembly 102 is in a closed position. FIG. 3D depicts a bottom view of example communication device 100a being held in hand 305 while housing assembly 102 is in a closed position. FIG. 3E depicts a three-dimensional disassembled view of example communication device 100a with housing assembly 102 in a closed position. FIG. 3F depicts a side view of example communication device 100a of FIG. 3E. In FIGS. 3A-3F, first housing portion (base) 103a is pivotally connected to second housing portion 103b. For clarity, each handgrip has the hand substantially along a back surface of communication device 100a to provide an unimpeded view of a display. Aspects of the present disclosure also apply to holding communication device 100a with the hand substantially along the front surface, such as to show the display to another person.

Communication device 100a can have identical or similar components and functionality of communication device 100 (FIG. 1). Housing assembly 102 includes first housing portion 103a that is pivotally connected as a base to second housing portion 103b that acts as a flip housing. In one or more embodiments, antennas 137a-137d can be fabricated as a combination of a metal frame and laser direct structuring (LDS) components. The LDS process uses a thermoplastic material, doped with a (non-conductive) metallic inorganic compound activated by means of laser. Antennas 137a-137d enable supporting low band/low band (L/L) carrier aggregation (CA) or ENDC. Each of antennas 137a-137d is positioned at a respective corner of housing assembly 102. Each of antennas 137a-137d is configured to cover ultra-low band (ULB) and low band (LB) to support both main and diversity signals of primary control channels (PCCs) and secondary control channels (SCCs) with satisfactory antenna performance in the open position of housing assembly 102. In one or more embodiments, antennas 137a-137d are further configured to also independently cover mid-band (MB), high band (HB), and ultra-high band (UHB) in both open and closed positions of housing assembly 102. To improve hand grip performance or talk position with a head near communication device 100a, antennas 137a-137b support antenna switch diversity and antennas 137c-137d support antenna switch diversity. Modem 144 (FIG. 1) can select one of the pair of antennas as transmit antenna depending on which antenna is unblocked. In one or more embodiments, each antenna 137a-137d is configured to support low, mid, high, and ultra-high bands for both signal transmission reception. Modem 144 (FIG. 1) can impose a specific absorption rate (SAR) cutback for antennas 137a-137b being used to transmit. Modem 144 (FIG. 1) can select antennas 137a-137b that can transmit with the highest total radiated power (TRP) for a particular communication band.

Figure 4A:
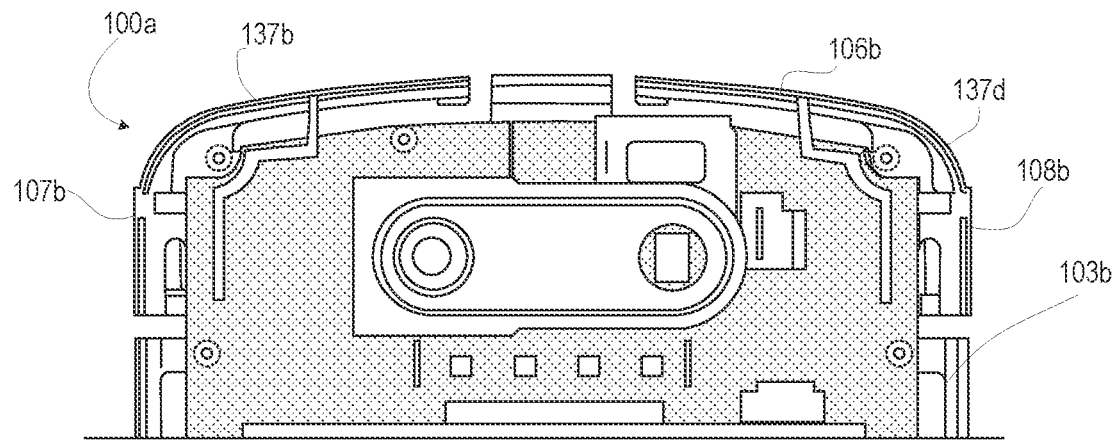
FIG. 4A depicts a front detail view of the antennas on a second (flip) housing portion of the example communication device of FIG. 3B, according to one or more embodiments.

FIG. 4A depicts a front detail view of two antennas (137b, 137d) on second (flip) housing portion 103b of example communication device 100a. With reference to the depicted directions, second antenna 137b is positioned at an upper left corner of communication device 100a and is supported by second housing portion 103b. Second antenna 137b is located on distal side 106b, wrapping partially onto first lateral (left) side 107b. Second antenna 137b can support a third receiver chain ("Rx2") 142 (FIG. 1) for LTE communication and a fourth receiver chain ("Rx3") for 5G NR communication. As used herein, first and second transceiver chains can be respectively numbered "TRx0" and "TRx1" and third and fourth receiver chains can be numbered "Rx2" and "Rx3" respectively. First and second transceiver chains are used as primary and secondary transceivers respectively for switching in response to a particular antenna being blocked by an object such as a user's hand. Similarly, third and fourth receiver chains act as primary and secondary receivers respectively for switching in response to a particular antenna being blocked by an object such as a user's hand. Fourth antenna 137d is positioned at an upper right corner of communication device 100a and is supported by second housing portion 103b. Fourth antenna 137d can support third receiver chain ("Rx2") for 5G NR communication and fourth receiver chain ("Rx3") for LTE communication.

Figure 4B:
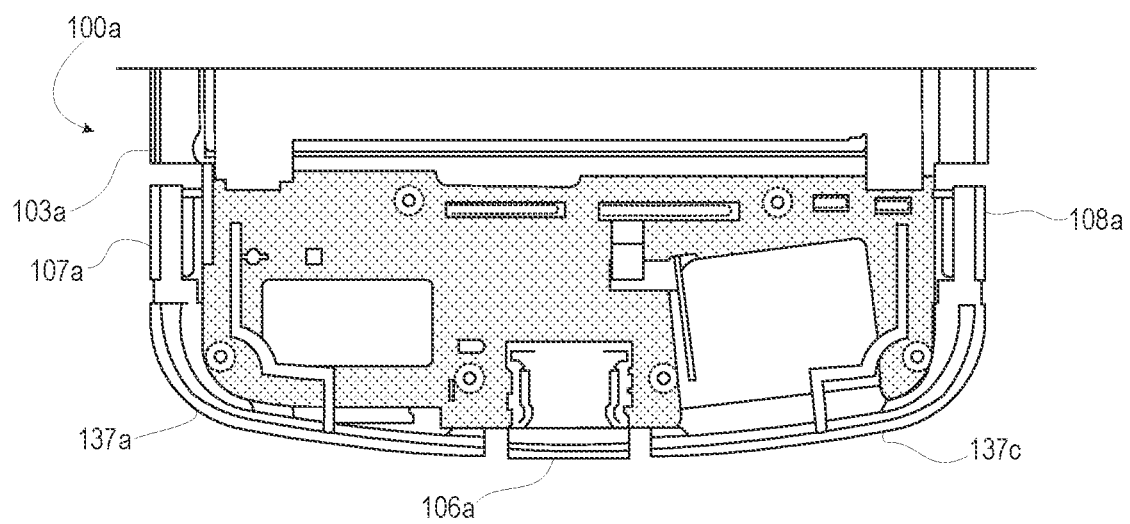
FIG. 4B depicts a front detail view of the antennas on a first (base) housing portion of the example communication device of FIG. 3B, according to one or more embodiments.

FIG. 4B depicts a front detail view of the antennas 137a, 137c on first (base) housing portion of the example communication device 100a. With reference to the depicted directions, first antenna 137a is positioned at a lower left corner of communication device 100a and is supported by first housing portion 103a. First antenna 137a is located on distal side 106a, wrapping partially onto first lateral (left) side 107a. First antenna 137a can support first transceiver chain ("TRx0") for LTE communication and second transceiver chain ("TRx1") for 5G NR communication. Third antenna 137c is positioned at a lower right corner of communication device 100a and is supported by first housing portion 103a. Third antenna 137c is located on distal side 106a, wrapping partially onto second lateral (right) side 108a. Third antenna 137c can support second transceiver chain ("TRx1") for 5G NR communication and first transceiver chain ("TRx0") for LTE communication.

Figure 5:
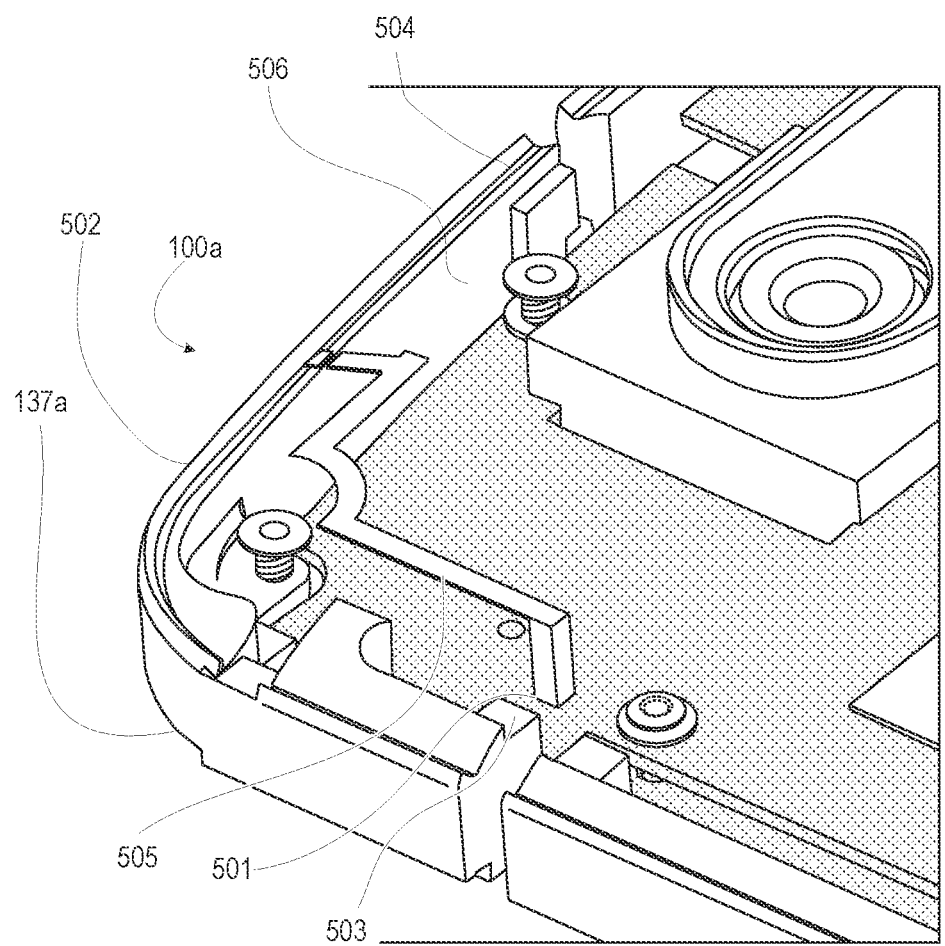
FIG. 5 depicts a front detail view of one antenna of the communication device of FIG. 4B, according to one or more embodiments.

FIG. 5 depicts a front detail view of one antenna 137b of communication device 100a. In one or more embodiments, antenna 137a is configured for at least low band which includes ultra-low band. In one or more embodiments, antenna 137a is further configured to also communicate via mid-band (MB), high band (HB), and ultra-high band (UHB). A distributed inductive ground 505 is electrically connected at one end to printed circuit board (PCB) ground 501 and electrically connected at another end approximately at a midpoint of a metal band 502 of first antenna 137a, forming an inverted F antenna (IFA). An IFA operates as a folded monopole with a distributed capacitive shunt loading. Antenna feed 503 is electrically connected to one end of first antenna 137a. First antenna 137a includes conductive transition 504 between metal band 502 and LDS structure 505506. In one or more embodiments, transition 504 is a flex PCB.

Figure 6:
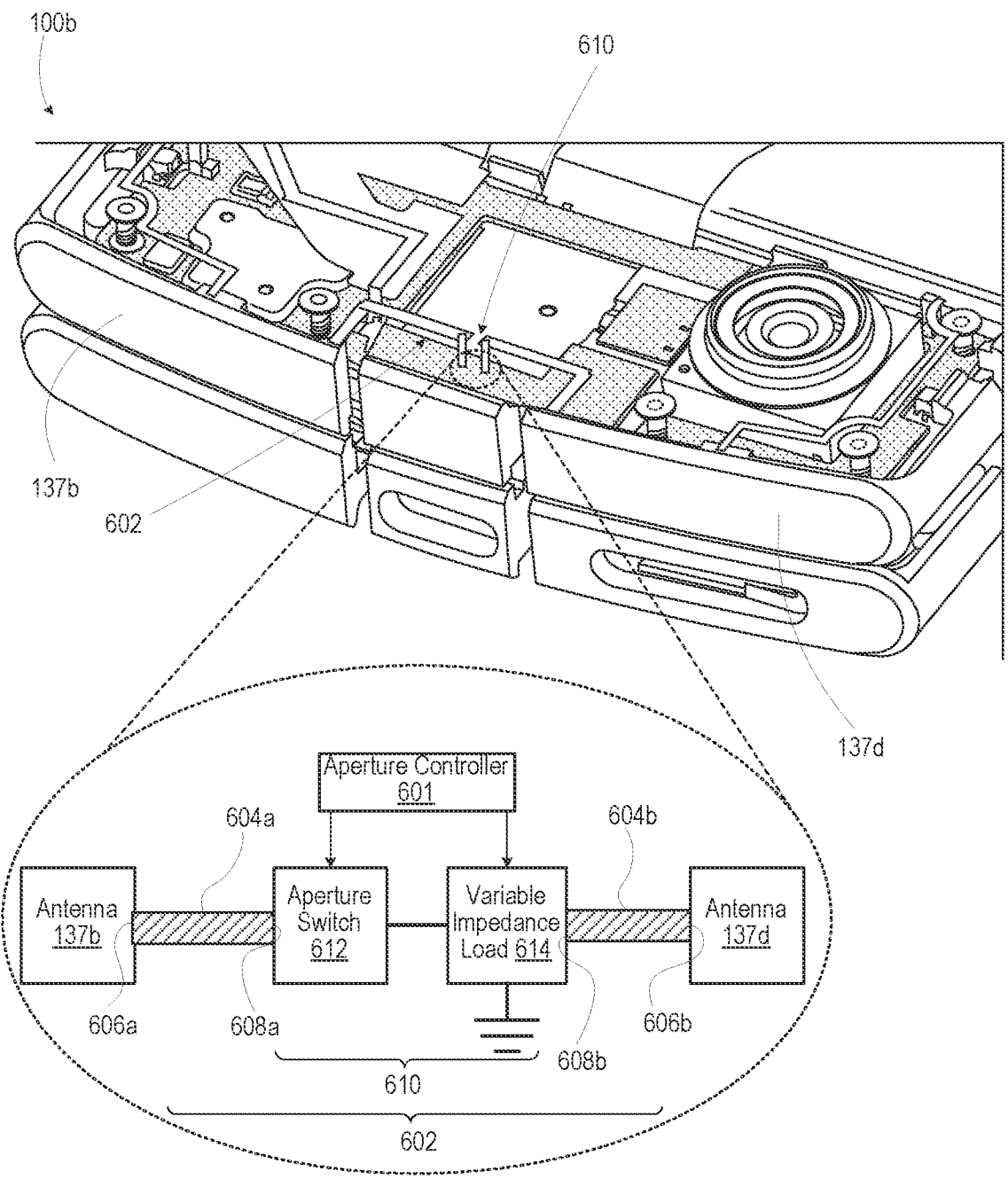
FIG. 6 depicts a three-dimensional detail view of an example communication device having an aperture controller, according to one or more embodiments.

FIG. 6 depicts a three-dimensional detail view of example communication device 100b annotated with a functional block diagram of aperture controller 601. Communication device 100b can have identical or similar components and functionality of communication devices 100 (FIG. 1) and 100a (FIG. 3A). Conductive bridge 602 includes left and right bridge portions 604a, 604b respectively coupled at outer ends 606a, 606b to second and fourth antennas 137b, 137d and having inner ends 608a, 608b spaced at aperture 610. In one or more embodiments, a similar or identical aperture controller 601 and conductive bridge 602 (not depicted) can be provided for first and third antennas 137a, 137c supported by first housing portion 103a. Conductive bridge 602 can be an LDS structure, stamped metal, a flex printed circuit board or other conductive material. Aperture controller 601 is electrically connected to inner ends 608a, 608b to adjustably connect second and fourth antennas 137b, 137d with a combination of aperture switch 612 and variable impedance load 614, which can be connected in series or as a shunt. Controller 101 (FIG. 1) configures aperture switch 612 to be open when housing assembly 102 is in the open position to enable second and fourth antennas 137b, 137d to operate independently. Controller 101 (FIG. 1) can configure aperture switch 612 to be closed when housing assembly 102 is in the closed position to enable second and fourth antennas 137b, 137d to operate dependently. To achieve either the best radiation or isolation, variable impedance load 614 is set to be adjustable on a band-by-band, use case, user interface (UI) setting or flip state basis.

Figure 7:
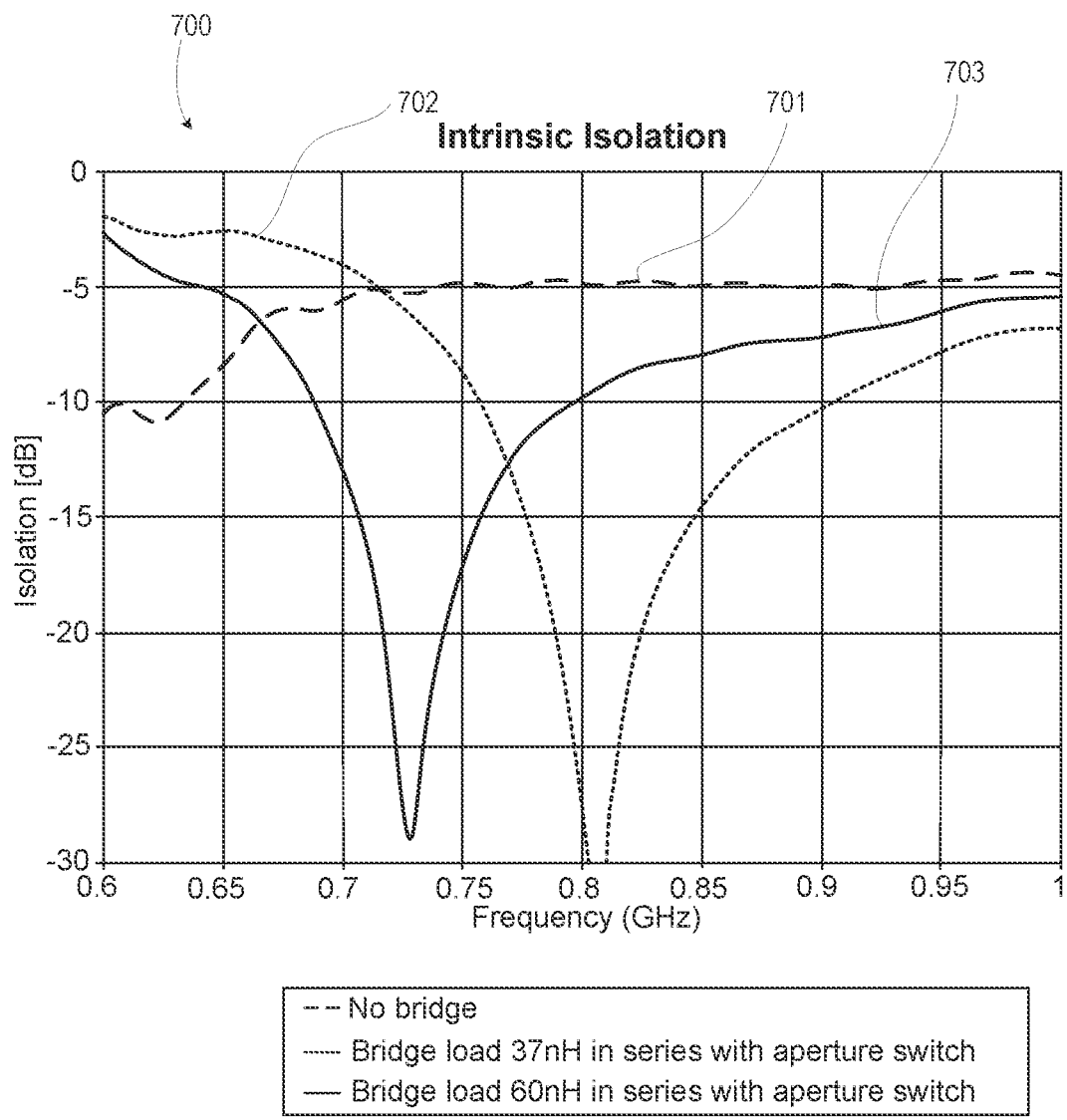
FIG. 7 depicts a graphical plot of intrinsic isolation (dB) as a function of frequency between two antennas selectively connected by the aperture controller of FIG. 6, according to one or more embodiments.

FIG. 7 depicts graphical plot 700 of intrinsic isolation (dB) as a function of frequency between first and third antennas 137a, 137c (FIG. 6) selectively connected by aperture controller 601 of FIG. 6. The aperture switch and variable load between flip antennas (second and fourth antennas 137b, 137d) through a bridge helps the radiation or isolation of the base antennas (first and third antennas 137a, 137c). In one or more alternative embodiments, an aperture bridge and variable impedance between flip antennas (second and fourth antennas 137b, 137d) can be configured to improve radiation or isolation between flip antennas (second and fourth antennas 137b, 137d). In one or more embodiments, Graphical plot 700 depicts the intrinsic isolation between base antennas when conductive bridge and aperture load is placed between the flip antennas (second and fourth antennas 137b, 137d). First trace 701 provides a baseline for having no conductive path between second and fourth antennas 137b, 137d (FIG. 6). In an example, opening aperture switch 612 removes any conductive path. Isolation is approximately −10 dB at 0.6 GHz, increasing to −5 dB at 0.7 GHz, and remaining at that level for higher frequencies. Second trace 702 simulates closing aperture switch 612 (FIG. 6) and adjusting variable impedance load 614 (FIG. 6), such as an electrical inductance, to 37 nano-Henry (nH). Isolation of lower than −30 dB results at 0.73 GHz. Third trace 703 simulates closing aperture switch 612 (FIG. 6) and adjusting variable impedance load 614 (FIG. 6) to 60 nH. Isolation of about-28 dB results at about 0.81 GHz.

Figure 8A:
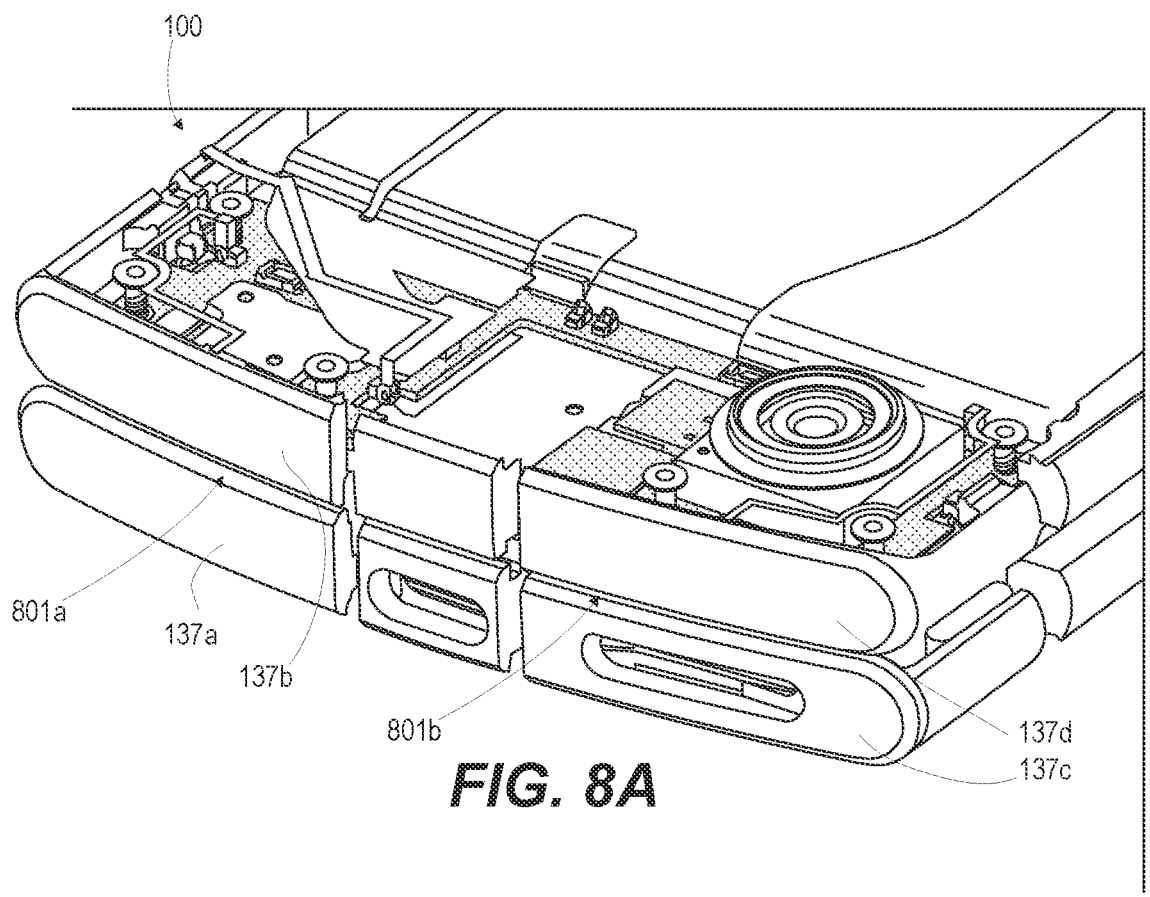
FIG. 8A depicts a three-dimensional detail view of the communication device with capacitive gaps respectively between left-side antennas and between right-hand antennas with the housing assembly in the closed position, according to one or more embodiments.

FIG. 8A depicts a three-dimensional detail view of example communication device 100 with capacitive gap 801a between first and second antennas 137a-137b and capacitive gap 801b between third and fourth antennas 137c-137d with housing assembly 102 in the closed position. Capacitive gap 801a provides electromagnetic coupling between first and second antennas 137a-137b, which are proximate to each other and aligned in parallel while housing assembly 102 is in the closed position. Capacitive gap 801b provides electromagnetic coupling between third and fourth antennas 137c-137d, which are proximate to each other and aligned in parallel while housing assembly 102 is in the closed position.

Figure 8B:
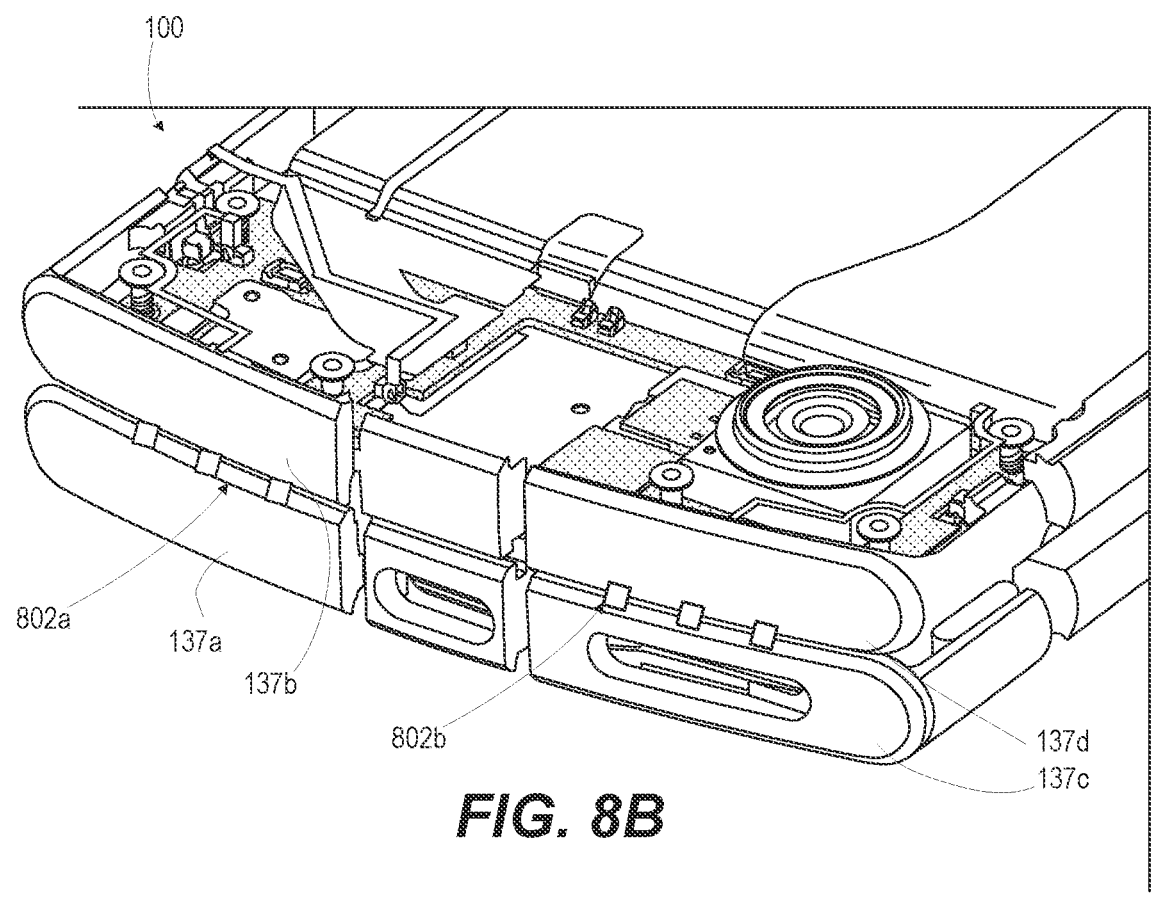
FIG. 8B depicts a three-dimensional detail view of the communication device with conductive elements respectively between left-side antennas and between right-hand antennas with the housing assembly in the closed position, according to one or more embodiments.

FIG. 8B depicts a three-dimensional detail view of example communication device 100 with conductive elements 802a between first and second antennas 137a-137b and conductive elements 802b between third and fourth antennas 137c-137d with housing assembly 102 in the closed position. Conductive elements 802a enable first and second antennas 137a-137b to operate as one antenna while housing assembly 102 is in the closed position. Conductive elements 802b enable third and fourth antennas 137c-137d to operate as one antenna while housing assembly 102 is in the closed position. Conductive elements 802a-802b can be direct-contact pins, conductive paste, etched direct-contact metals, or other conductive structures that do not impede opening of housing assembly 102. Conductive elements 802a provide electrical connection between paired antennas 137a and 137c that are proximate and aligned in parallel while housing assembly 102 is in the closed position. Conductive elements 802b provide electrical connection between paired antennas 137c and 137d that are proximate and aligned in parallel while housing assembly 102 is in the closed position. The coupling facilitates operating first and second antennas 137a-137b without cancellation and operating third and fourth antennas 137c-137d without cancellation while housing assembly 102 is in the closed position. The coupling enables the paired antennas 137a-137d to operate as one antenna in the ULB/LB. Both paired antenna 137a-137d have two antenna feed/source networks 145 and two antenna matching networks 148 with antenna tuning capabilities. Modem 144 (FIG. 1) can configure which feed contacts are excited or terminated. The latter includes shorting, open circuiting, or compromising with an impedance load to ground. In one or more embodiments, modem 144 (FIG. 1) can excite both feed contacts. Modem 144 can configure excitation of a first pair of antennas 137a and 137c and a second pair of antennas 137b and 137d depending on modem metrics, previously set parameters, or closed loop tuning through antenna switch diversity or tuning of antenna impedance tuner (148).

Figure 9:
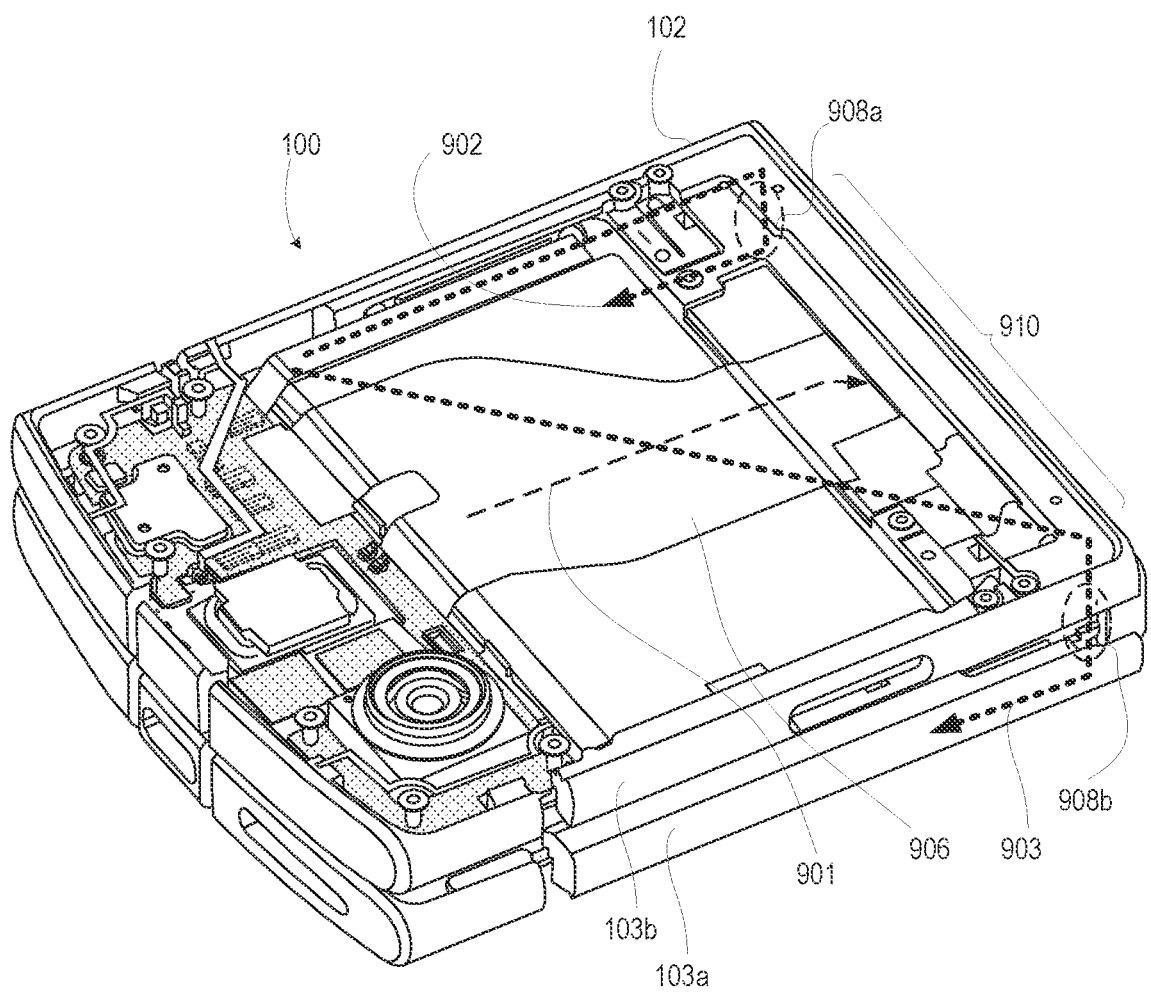
FIG. 9 depicts a top three-dimensional view of the example communication device of FIG. 7 having multiple electrical ground paths, according to one or more embodiments.

FIG. 9 depicts a top three-dimensional view of communication device 100 having multiple electrical ground paths between first and second housing portions 103a-103b. In one or more embodiments, three electrical grounding paths 901-903 are provided between second and fourth antennas 137b, 137d in second housing portion 103b as well as second housing assembly (flip) and functional components in first housing portion (base) 103a as well as first housing assembly (base). These electrical grounding paths include: (i) ground conductors on flex printed circuit board 906, left metal hinge 908a, and right metal hinge 908b. Right and left hinges 908a-908b of hinge mechanism 910 pivotally connect first and second housing portions 103a-103b. Limiting ground current flow to substantially flow through only one of the three paths can improve antenna performance. For example, sizing of ground conductors in the flex printed circuit board 906 and electrical insulation (e.g., painted screws) inserted into one of the left and right hinges 906a-908b can reduce (choke) current flow. Limiting of the grounding can improve radiation efficiency in select bands or channels while housing assembly 102 is in the closed state. Limiting the current flow to only one or two paths between the two housing portions 103a-103b could enforce current to take longer paths and will effectively increase antenna length, hence antenna efficiency in select bands.

Figure 10:
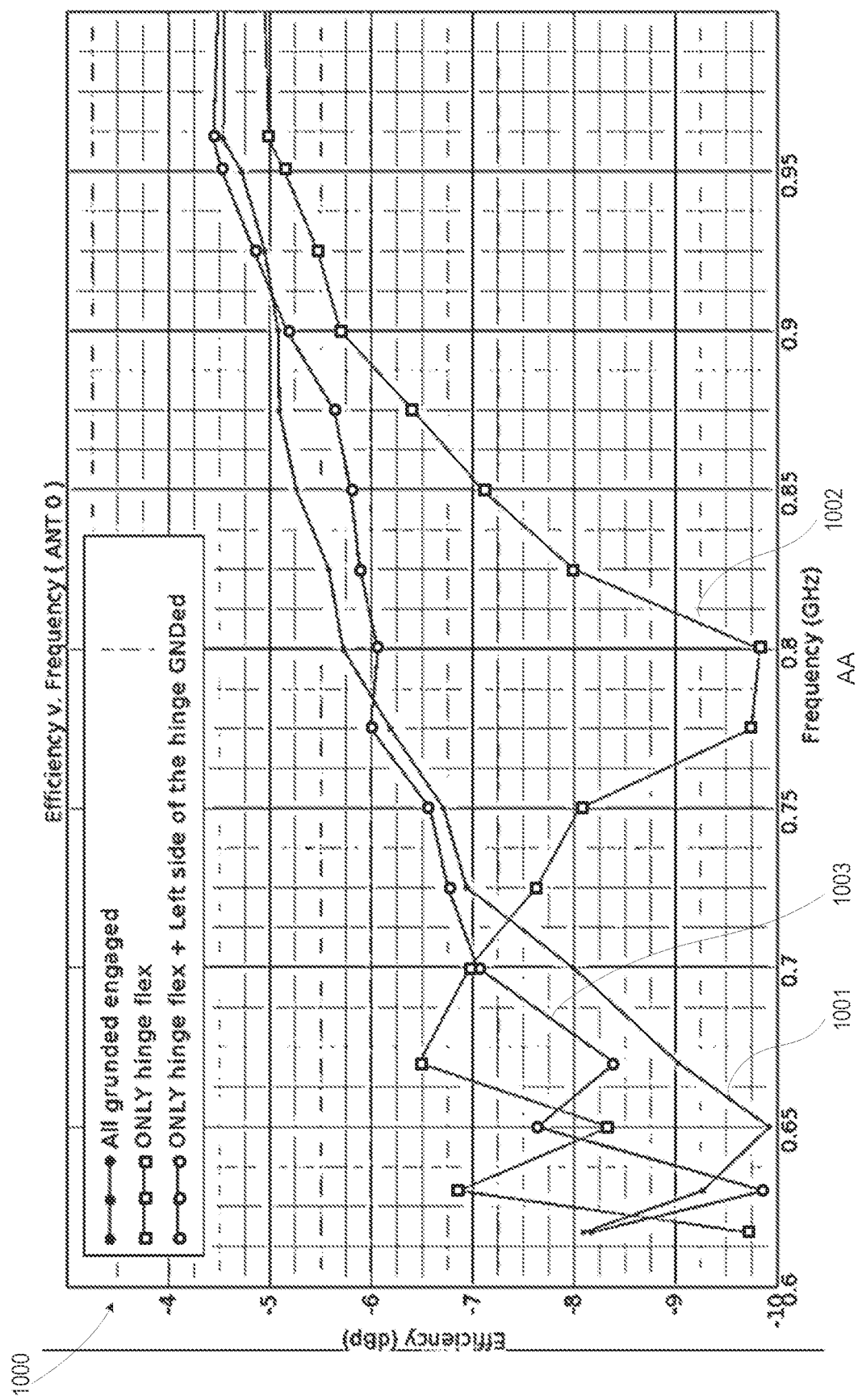
FIG. 10 depicts graphical plot of antenna efficiency (dB) as a function for three configurations of antenna ground paths of the communication device of FIG. 9, according to one or more embodiments.

FIG. 10 depicts graphical plot 1000 of antenna efficiency (dB) as a function for combinations of three antenna ground paths of communication device 100. First trace 1001 plots antenna efficiency when using all grounding paths 901-903 (FIG. 9), which has less antenna efficiency for most frequencies below 0.7 GHz than second and third traces 902-903. Second trace 1002 plots antenna efficiency when using only hinge flex ground path. Second trace 1002 indicates relatively good performance up to 0.7 GHz but suffers with poor antenna efficiency in a mid-range of 0.7-0.85 GHz. Third trace 1003 plots antenna efficiency when using grounding paths 901-902 (FIG. 9) with hinge 908b insulated, resulting in relatively good performance above 0.65 GHz. Different groundings change the current directions and hence improve the radiation in select bands.

Figure 11:
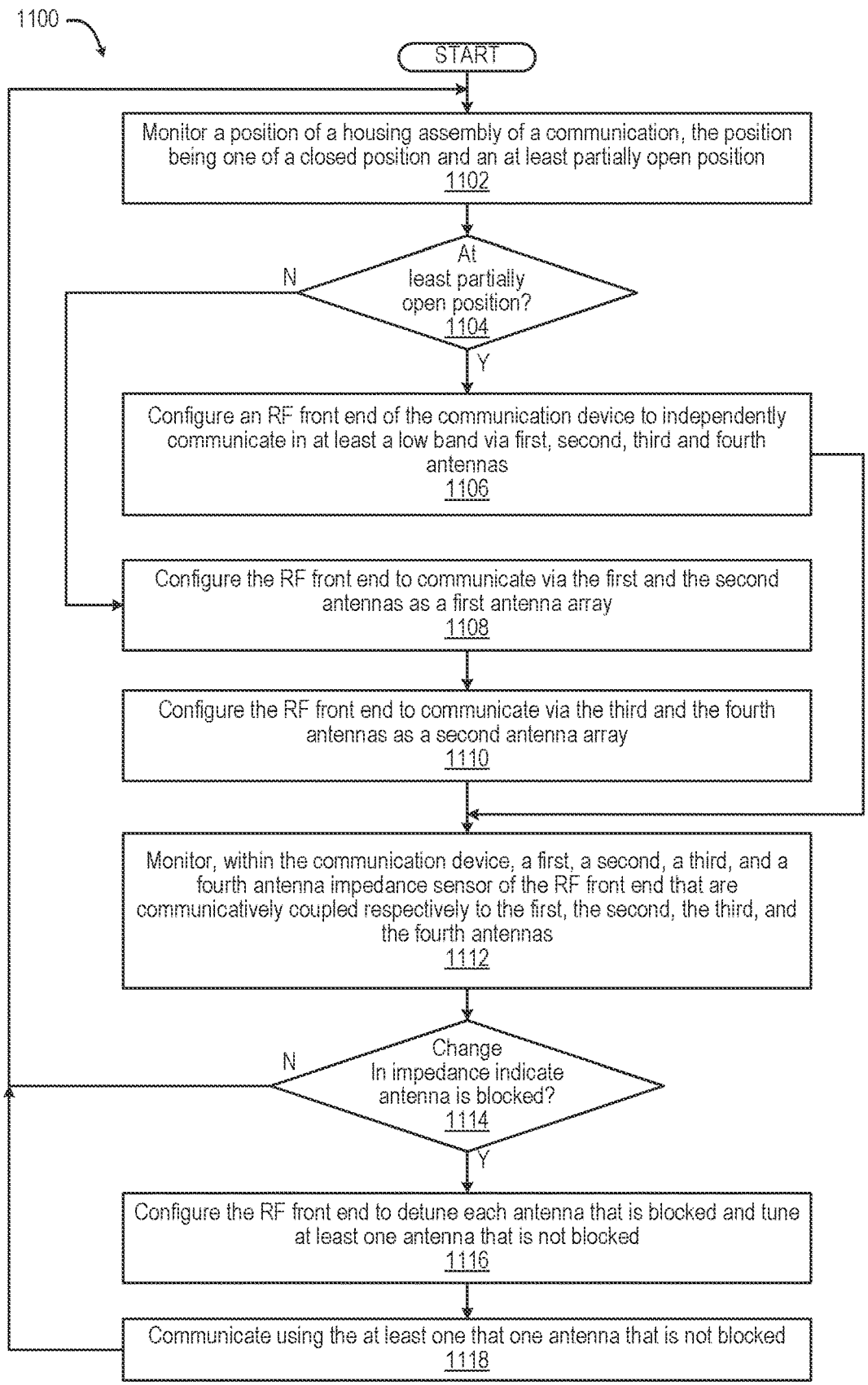
FIG. 11 presents a flow diagram of a method for enabling multiple transceiver communication in a communication device having a configurable housing assembly, according to one or more embodiments.

FIG. 11 presents a flow diagram of a method for enabling multiple transceiver communication in a communication device having a configurable housing assembly. The description of method 1100 is provided with general reference to the specific components illustrated within the preceding FIGS. 1, 2A-2C, 3A-3F, 4-7, 8A-8B, and 9-10. In at least one embodiment, communication device 100, managed by controller 101, performs method 1100 by dynamically configuring RF front end 139 in response to housing position sensor 109 (FIG. 1). Controller 101 executes antenna control application 115 (FIG. 1) to provide the multiple transceiver communication functionality of method 1100. Specific components described in method 1100 can be identical or similar to components of the same name used to describe preceding FIGS. 1, 2A-2C, 3A-3F, 4-7, 8A-8B, and 9-10. Method 1100 includes monitoring a position of a housing assembly of a communication, the position being one of a closed position and an at least partially open position (block 1102). A determination is made whether the housing assembly is in the at least partially open position (decision block 1104). In response to determining that a housing assembly of a communication device is in an at least partially open position, method 1100 includes configuring an RF front end of the communication device to independently communicate in at least a low band via first, second, third and fourth antennas (block 1106). Each antenna has an elongated shape and is configured to communicate in at least a low band. The first and the third antenna are supported by a first housing portion of the housing assembly. The second and the fourth antenna are supported by a second housing portion of the housing assembly. The first, the second, the third, and the fourth antennas are separated from each other when the housing assembly is in the at least partially open position.

In response to determining that the housing assembly is not in the at least partially open position (i.e., in the closed position), method 1100 includes configuring the RF front end to communicate via the first and the second antennas as a first antenna array (block 1108). Method 1100 includes configuring the RF front end to communicate via the third and the fourth antennas as a second antenna array (block 1110). The first and second antennas are proximate and substantially aligned in parallel to each other when the housing assembly is in the closed position. The third and the fourth antennas are proximate and substantially aligned in parallel to each other when the housing assembly is in the closed position.

In one or more embodiments, after performing block 1106 or 1110, method 1100 includes monitoring, within the communication device, a first, a second, a third, and a fourth antenna impedance sensor of the RF front end that are communicatively coupled respectively to the first, the second, the third, and the fourth antennas (block 1112). Method 1100 includes determining whether at least one of the first, the second, the third, and the fourth antenna impedance sensors detects a change in impedance that is indicative of blocking of the respective antenna (decision block 1114). In response to determining that the impedance sensors did not detect a change, then method 1100 returns to block 1102. In response to determining that the at least one of the first, the second, the third, and the fourth antenna impedance sensors did detect a change in impedance that is indicative of blocking of the respective antenna, method 1100 includes configuring the RF front end to detune each antenna that is blocked and tune at least one antenna that is not blocked (block 1116). Method includes communicating using the at least one antenna that is not blocked (block 1118). Then method 1100 returns to block 1102.

Figure 12:
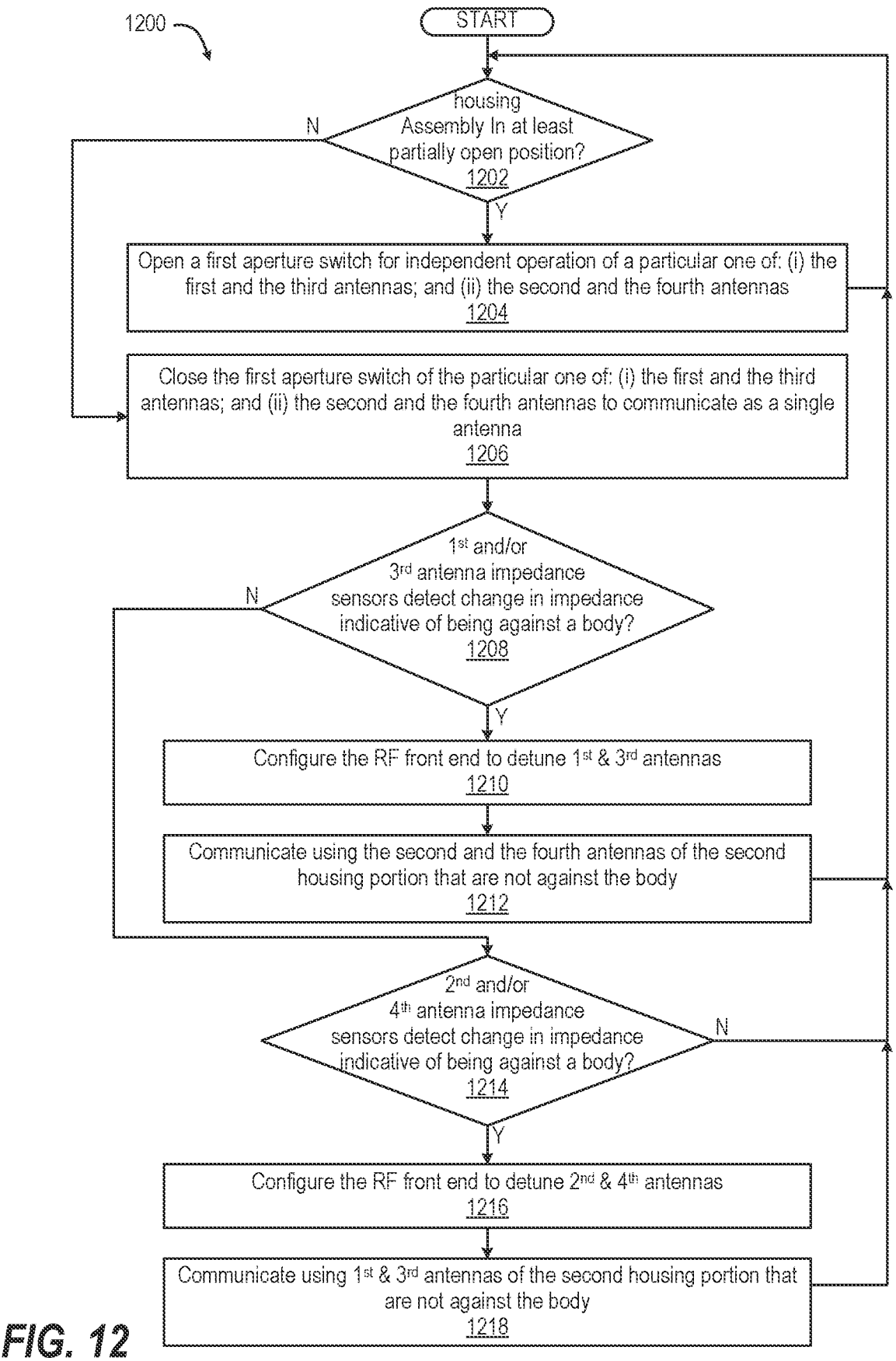
FIG. 12 presents a flow diagram of a method for simultaneous multiple transceiver communication in a communication device having a configurable housing assembly, according to one or more embodiments.

FIG. 12 presents a flow diagram of a method for enabling simultaneous multiple transceiver communication in a communication device having multiple antennas within a configurable housing assembly. The description of method 1200 is provided with general reference to the specific components illustrated within the preceding FIGS. 1, 2A-2C, 3A-3F, 4-7, 8A-8B, and 9-11. In at least one embodiment, communication device 100, managed by controller 101, performs method 1200 by dynamically configuring RF front end 139 in response to housing position sensor 109 (FIG. 1). Controller 101 executes antenna control application 115 (FIG. 1) to provide the multiple transceiver communication functionality of method 1200. Specific components described in method 1200 can be identical or similar to components of the same name used to describe preceding FIGS. 1, 2A-2C, 3A-3F, 4-7, 8A-8B, and 9-11. Method 1200 includes determining whether the housing assembly is in the at least partially open position (decision block 1202). In response to determining that a housing assembly of a communication device is in an at least partially open position, method 1200 includes opening a first aperture switch to allow independent operation of a particular one of: (i) the first and the third antennas; and (ii) the second and the fourth antennas (block 1204). The communication device includes a first antenna bridge communicatively coupled between the one of: (i) the first and the third antennas; and (ii) the second and the fourth antennas. The first antenna bridge includes a first aperture. The first aperture switch is electrically connected across the first aperture.

In response to determining that the housing assembly is not in the at least partially open position (i.e., in the closed position), method 1200 includes closing the first aperture switch of the particular one of: (i) the first and the third antennas; and (ii) the second and the fourth antennas to enable the corresponding pair of antennas to communicate as a single antenna (block 1206). Method 1200 includes determining whether at least one of the first and the third antenna impedance sensors detect the respective change in impedance that is indicative of the first housing portion being against a body (decision block 1208). In response to determining that both of the first and the third antenna impedance sensors detect the respective change in impedance that is indicative of the first housing portion being against a body, method 1200 includes configuring the RF front end to detune the first and the third antenna (block 1210). Method 1200 includes communicating using the second and the fourth antennas of the second housing portion that are not against the body (block 1212). Then method 1200 returns to block 1202.

In response to determining that at least one of the first and the third antenna impedance sensors do not detect the respective change in impedance that is indicative of the first housing portion being against a body, method 1200 includes determining whether at least one of the second and the fourth antenna impedance sensors detect the respective change in impedance that is indicative of the second housing portion being against a body (decision block 1214). In response to determining that neither of the second and the fourth antenna impedance sensors detect the respective change in impedance that is indicative of the second housing portion being against the body, method 1200 returns to block 1202. In response to determining that at least one of the second and the fourth antenna impedance sensors detect the respective change in impedance that is indicative of the second housing portion being against the body, method 1200 includes configuring the RF front end to detune the second and the fourth antenna (block 1216). Method 1200 includes communicating using the second and the fourth antennas of the second housing portion that are not against the body (block 1218). Then method 1200 returns to block 1202.

In one or more embodiments, method 1200 includes configuring the RF front end to independently communicate in one or more of mid-band, high band, and ultra-high band. Method 1200 includes configuring the RF front end for each position in which the housing assembly can be placed. The positions can include the closed position and in each of the at least partially open positions, including the fully open position. In response to determining that the housing assembly is in the at least partially open position, method 1200 includes configuring the RF front end to communicate via the first, second, third and fourth antennas independently in at least one of an ultra-low band and a low band. In response to determining that the housing assembly is in the closed position, method 1200 includes configuring the RF front end to communicate via the first and the second antennas as a first antenna array and to communicate via the third and the fourth antennas as a second antenna array in at least one of the ultra-low band and the low band.

Aspects of the present innovation are described above with reference to flowchart illustrations and/or block diagrams of methods, apparatus (systems) and computer program products according to embodiments of the innovation. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

As will be appreciated by one skilled in the art, embodiments of the present innovation may be embodied as a system, device, and/or method. Accordingly, embodiments of the present innovation may take the form of an entirely hardware embodiment or an embodiment combining software and hardware embodiments that may all generally be referred to herein as a "circuit," "module" or "system."

While the innovation has been described with reference to exemplary embodiments, it will be understood by those skilled in the art that various changes may be made, and equivalents may be substituted for elements thereof without departing from the scope of the innovation. In addition, many modifications may be made to adapt a particular system, device, or component thereof to the teachings of the innovation without departing from the essential scope thereof. Therefore, it is intended that the innovation not be limited to the particular embodiments disclosed for carrying out this innovation, but that the innovation will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the innovation. As used herein, the singular forms "a", "an" and "the" are intended to include the plural forms as well, unless the context clearly indicates otherwise. It will be further understood that the terms "comprise" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present innovation has been presented for purposes of illustration and description but is not intended to be exhaustive or limited to the innovation in the form disclosed. Many modifications and variations will be apparent to those of ordinary skill in the art without departing from the scope and spirit of the innovation. The embodiments were chosen and described in order to best explain the principles of the innovation and the practical application, and to enable others of ordinary skill in the art to understand the innovation for various embodiments with various modifications as are suited to the particular use contemplated.

What is claimed is:

1. A communication device comprising:
   a housing assembly having first and second housing portions connected for relative movement between an open position and a closed position;
   at least four antennas each having an elongated shape and configured to communicate in at least a low band, a first and a third antenna of the at least four antennas supported by the first housing portion, a second and a fourth antenna of the at least four antennas supported by the second housing portion, the first and second antennas proximate and aligned in parallel to each other when the housing assembly is in the closed position and positioned separated from each other when the housing assembly is in the open position, the third and fourth antennas proximate and aligned in parallel to each other when the housing assembly is in the closed position and positioned separated from each other when the housing assembly is in the open position;
   a housing position sensor that detects when the housing assembly is in the closed position and when the housing assembly is in an at least partially open position;
   a radio frequency (RF) front end communicatively coupled to the at least four antennas and having two or more transceivers to utilize the at least four antennas for simultaneous dual connectivity for low band communication; and
   a controller communicatively coupled to the housing position sensor and the RF front end, and which:
      in response to determining that the housing assembly is in the at least partially open position, configures the RF front end to communicate via the first, second, third and fourth antennas independently; and
      in response to determining that the housing assembly is in the closed position, configures the RF front end to communicate via the first and the second antennas as a first antenna array and to communicate via the third and the fourth antennas as a second antenna array.

2. The communication device of claim 1, wherein the controller:
   configures the RF front end to independently communicate via the first, second, third and fourth antennas in one or more of mid-band, high band, and ultra-high band with the housing assembly in both the closed position and the at least partially open position;
   in response to determining that the housing assembly is in the at least partially open position, configures the RF front end to independently communicate via the first, second, third and fourth antennas in at least one of an ultra-low band and a low band; and
   in response to determining that the housing assembly is in the closed position, configures the RF front end to communicate via a pairing of the first and the second antennas as a first antenna array and to communicate via a pairing of the third and the fourth antennas as a second antenna array in at least one of the ultra-low band and the low band.

3. The communication device of claim 1, wherein one or more of the at least four antennas comprise a metal band configured as an inverted F-shaped antenna (IFA) with a distributed inductive ground electrically connected approximately at a midpoint of the metal band.

4. The communication device of claim 1, wherein:
   the RF front end comprises a first, a second, a third, and a fourth antenna impedance sensor that are each communicatively coupled to the controller and that are communicatively coupled respectively to the first, the second, the third, and the fourth antennas; and
   the controller:
      determines that at least one of the first, the second, the third, and the fourth antenna impedance sensors detects a change in impedance that is indicative of blocking of the respective antenna; and
      configures the RF front end to detune each antenna that is blocked and tune at least one antenna that is not blocked; and
      communicates using the at least one that one antenna that is not blocked.

5. The communication device of claim 4, wherein the controller:
   in response to determining that the first and the second antennas of the first antenna array are blocked, communicates using at least one of the third and the fourth antennas of the second antenna array; and
   in response to determining that the third and the fourth antennas of the second antenna array are blocked, communicates using at least one of the first and the second antennas of the first antenna array.

6. The communication device of claim 4, wherein the controller:
   in response to determining that both the first antenna and the third antenna are blocked, communicates using at least one of the second antenna and the fourth antenna; and
   in response to determining that both the second antenna and the fourth antenna are blocked, communicates using at least one of the one antenna and the third antenna.

7. The communication device of claim 1, further comprising:
   a first antenna bridge communicatively coupled between a particular one of: (i) the first and the third antennas; and (ii) the second and the fourth antennas, the first antenna bridge comprising a first aperture; and
   a first aperture switch electrically connected in series across the first aperture, the first aperture switch communicatively coupled to the controller, wherein the controller:
      in response to determining that the housing assembly is in the at least partially open position, opens the first aperture switch for independent operation of the particular one of: (i) the first and the third antennas; and (ii) the second and the fourth antennas; and
      in response to determining that the housing assembly is in the closed position, closes the first aperture switch of the particular one of: (i) the first and the third antennas; and (ii) the second and the fourth antennas to communicate as a single antenna.

8. The communication device of claim 7, further comprising a variable load electrically connected in one of a shunt and/or a series arrangement with the first aperture switch and communicatively coupled to the controller, wherein the controller:
  in response to determining that the housing assembly is in the closed position:
    determines whether the particular one of (i) the first and the third antennas and (ii) the second and the fourth antennas is being used for communicating;
    in response to determining the particular one of (i) the first and the third antennas and (ii) the second and the third antennas is being used for communicating, adjusts the variable impedance load to tune, for radiation efficiency, the particular one of (i) the first and the third antennas and (ii) the second and the fourth antennas; and
    in response to determining the particular one of (i) the first and the third antennas; and (ii) the second and the fourth antennas is being used for communicating, adjusts the variable impedance load, for at least one of antenna isolation or antenna envelope correlation coefficient reduction, the particular one of (i) the first and the third antennas and (ii) the second and the fourth antennas.

9. The communication device of claim 1, wherein:
  the first and the second antennas of the first antenna array are positioned for capacitive coupling while the housing assembly is in the closed position to communicate as a single antenna; and
  the third and the fourth antennas of the first antenna array are positioned for capacitive coupling while the housing assembly is in the closed position to communicate as a single antenna, wherein the controller configures the RF front end to communicate via the first and the second antennas as the first antenna array and to communicate via the third and the fourth antennas as the second antenna array in response to determining that the housing assembly is in the closed position by detuning one antenna and tuning another antenna of each antenna array.

10. The communication device of claim 1, further comprising:
  one or more electrical conductors attached to one of the first and the second antennas of the first array and that contact the other one of the first and the second antennas of the first antenna array in the closed position to communicate as a single antenna; and
  one or more electrical conductors attached to one of the third and the fourth antennas of the first array that contact the other one of the third and the fourth antennas of the second antenna array in the closed position to communicate as a single antenna, wherein the controller configures the RF front end to communicate via the first and the second antennas as the first antenna array and to communicate via the third and the fourth antennas as the second antenna array in response to determining that the housing assembly is in the closed position by detuning one antenna and tuning another antenna of each antenna array.

11. The communication device of claim 1, further comprising a hinge mechanism having at least a first and a second hinge that pivotally connect the first and the second housing portions, wherein a first ground pathway that passes through the first hinge of the hinge mechanism has substantially lower electrical resistance than a second ground pathway that passes through the second hinge of the hinge mechanism to improve antenna radiation performance by at least one of the first, the second, the third, and the fourth antennas.

12. A method comprising:
  in response to determining that a housing assembly of a communication device is in an at least partially open position, configuring a radio frequency (RF) front end of the communication device to independently communicate in at least a low band via first, second, third and fourth antennas, each antenna having an elongated shape and configured to communicate in at least a low band, the first and the third antenna supported by a first housing portion of the housing assembly, the second and the fourth antenna supported by a second housing portion of the housing assembly, the first, the second, the third, and the fourth antennas separated from each other when the housing assembly is in the at least partially open position;
  in response to determining that the housing assembly is in a closed position, configuring the RF front end to communicate via the first and the second antennas as a first antenna array and to communicate via the third and the fourth antennas as a second antenna array, the first and second antennas proximate and substantially aligned in parallel to each other when the housing assembly is in the closed position, the third and the fourth antennas proximate and substantially aligned in parallel to each other when the housing assembly is in the closed position.

13. The method of claim 12, further comprising:
  configuring the RF front end to independently communicate in one or more of mid-band, high band, and ultra-high band in both the closed position and the at least partially open position;
  in response to determining that the housing assembly is in the at least partially open position, configuring the RF front end to communicate via the first, second, third and fourth antennas independently in at least one of an ultra-low band and a low band; and
  in response to determining that the housing assembly is in the closed position, configuring the RF front end to communicate via the first and the second antennas as a first antenna array and to communicate via the third and the fourth antennas as a second antenna array in at least one of the ultra-low band and the low band.

14. The method of claim 12, further comprising:
  monitoring, within the communication device, a first, a second, a third, and a fourth antenna impedance sensor of the RF front end that are communicatively coupled respectively to the first, the second, the third, and the fourth antennas;
  determining that at least one of the first, the second, the third, and the fourth antenna impedance sensors detect a change in impedance that is indicative of blocking of the respective antenna; and
  configuring the RF front end to detune each antenna that is blocked and tune at least one antenna that is not blocked; and
  communicating using the at least one that one antenna that is not blocked.

15. The method of claim 14, further comprising:
  in response to determining that both of the first and the third antenna impedance sensors detect the respective change in impedance that is indicative of the first housing portion being against a body:
    configuring the RF front end to detune the first and the third antenna; and communicating using the second and the fourth antennas of the second housing portion that are not against the body; and in response to determining that both of the second and the fourth antenna impedance sensors detect the respective change in impedance that is indicative of the second housing portion being against the body:
- configuring the RF front end to detune the second and the third antenna; and
- communicating using the second and the fourth antennas of the second housing portion that are not against the body.

16. The method of claim 12, further comprising:

in response to determining that the housing assembly is in the at least partially open position, opening a first aperture switch for independent operation of a particular one of: (i) the first and the third antennas; and (ii) the second and the fourth antennas, the communication device comprising a first antenna bridge communicatively coupled between the one of: (i) the first and the third antennas; and (ii) the second and the fourth antennas, the first antenna bridge comprising a first aperture, the first aperture switch electrically connected across the first aperture; and in response to determining that the housing assembly is in the closed position, closing the first aperture switch of the particular one of: (i) the first and the third antennas; and (ii) the second and the fourth antennas to communicate as a single antenna.

17. The method of claim 16, further comprising:

in response to determining that the housing assembly is in the closed position:
- determining whether the particular one of (i) the first and the third antennas and (ii) the second and the fourth antennas are being used for communicating; and
- in response to determining the particular one of (i) the first and the third antennas and (ii) the second and the third antennas are being used for communicating, adjusting a variable impedance load for radiating efficiency to tune the particular one of (i) the first and the third antennas and (ii) the second and the fourth antennas, the variable load electrically connected in one of a shunt and a series arrangement with the first aperture switch; and
- in response to determining the particular one of (i) the first and the third antennas and (ii) the second and the fourth antennas are not being used for communicating, adjusting the variable impedance load to detune the particular one of (i) the first and the third antennas and (ii) the second and the fourth antennas for antenna isolation.

18. A computer program product comprising:

a computer readable storage device; and program code on the computer readable storage device that when executed by a processor associated with a communication device, the program code enables the communication device to provide the functionality of:

in response to determining that first and second housing portions of a housing assembly of a communication device is in the at least partially open position, configuring a radio frequency (RF) front end of the communication device to independently communicate in at least a low band via first, second, third and fourth antennas, each having an elongated shape and configured to communicate in at least a low band, the first and the third antenna supported by the first housing portion, the second and the fourth antenna supported by the second housing portion, the first, the second, the third, and the fourth antennas separated from each other when the housing assembly is in the open position;

in response to determining that the housing assembly is in the closed position, configuring the RF front end to communicate via the first and the second antennas as a first antenna array and to communicate via the third and the fourth antennas as a second antenna array, the first and second antennas proximate and substantially aligned in parallel to each other when the housing assembly is in the closed position, the third and the fourth antennas proximate and substantially aligned in parallel to each other when the housing assembly is in the closed position.

19. The computer program product of claim 18, wherein the program code enables the communication device to provide the functionality of:

monitoring a first, a second, a third, and a fourth antenna impedance sensor of the RF front end that are communicatively coupled respectively to the first, the second, the third, and the fourth antennas;

determining that at least one of the first, the second, the third, and the fourth antenna impedance sensors detect a change in impedance that is indicative of blocking of the respective antenna; and configuring the RF front end to detune each antenna that is blocked and tune at least one antenna that is not blocked; and communicating using the at least one that one antenna that is not blocked.

20. The computer program product of claim 19, wherein the program code enables the communication device to provide the functionality of:

in response to determining that both of the first and the third antenna impedance sensors detect the respective change in impedance that is indicative of the first housing portion being against a body:
- configuring the RF front end to detune the first and the third antenna; and
- communicating using the second and the fourth antennas of the second housing portion that are not against the body; and in response to determining that both of the second and the fourth antenna impedance sensors detect the respective change in impedance that is indicative of the second housing portion being against the body:
- configuring the RF front end to detune the second and the third antenna; and
- communicating using the second and the fourth antennas of the second housing portion that are not against the body.

* * * * *